United States Patent
Ickin et al.

(10) Patent No.: US 11,743,158 B2
(45) Date of Patent: Aug. 29, 2023

(54) INITIAL BITRATE SELECTION FOR A VIDEO DELIVERY SESSION

(71) Applicant: Telefonaktiebolaget LM Ericsson (publ), Stockholm (SE)

(72) Inventors: Selim Ickin, Stocksund (SE); Tomas Lundberg, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 654 days.

(21) Appl. No.: 16/349,384

(22) PCT Filed: Nov. 14, 2016

(86) PCT No.: PCT/EP2016/077562
§ 371 (c)(1),
(2) Date: May 13, 2019

(87) PCT Pub. No.: WO2018/086713
PCT Pub. Date: May 17, 2018

(65) Prior Publication Data
US 2019/0334803 A1    Oct. 31, 2019

(51) Int. Cl.
*H04L 12/00* (2006.01)
*H04L 43/0852* (2022.01)
(Continued)

(52) U.S. Cl.
CPC ........ *H04L 43/0852* (2013.01); *H04L 65/612* (2022.05); *H04L 65/613* (2022.05);
(Continued)

(58) Field of Classification Search
None
See application file for complete search history.

(56) References Cited

U.S. PATENT DOCUMENTS

2008/0117930 A1*  5/2008  Chakareski ............. H04L 47/11
                                                          370/465
2012/0005361 A1*  1/2012  Knittle ............. H04W 28/0289
                                                          709/231
(Continued)

FOREIGN PATENT DOCUMENTS

CN    102577312 A    7/2012

OTHER PUBLICATIONS

Amerasinghe, Kush, "H.264 for the rest of us", https://www.adobe.com/content/dam/Adobe/en/devnet/video/articles/h264_primer/h264_primer.pdf, Nov. 11, 2009, pp. 1-4.
(Continued)

*Primary Examiner* — Sai Aung
*Assistant Examiner* — Lionel Preval
(74) *Attorney, Agent, or Firm* — Murphy, Bilak & Homiller, PLLC

(57) ABSTRACT

An initial bitrate is selected for a video delivery session by a user equipment (5, 200) performing, during a time window from initiation of a video player application in the user equipment (5, 200) up to selection of a video content, network measurements of a current condition of a network used to deliver the video content to the user equipment (5, 200). A respective initial buffer duration is provided for each bitrate available for the video content and where these respective initial buffer durations are predicted based on at least one network metric derived from the network measurements. An initial bitrate for delivering the video content over the network to the user equipment is selected based on the respective initial buffer durations.

24 Claims, 10 Drawing Sheets

(51) Int. Cl.
*H04L 65/80* (2022.01)
*H04N 21/44* (2011.01)
*H04N 21/442* (2011.01)
*H04L 65/612* (2022.01)
*H04L 65/613* (2022.01)

(52) U.S. Cl.
CPC ....... *H04L 65/80* (2013.01); *H04N 21/44004* (2013.01); *H04N 21/44209* (2013.01)

(56) References Cited

U.S. PATENT DOCUMENTS

| | | | |
|---|---|---|---|
| 2015/0334153 | A1 | 11/2015 | Koster et al. |
| 2016/0044125 | A1* | 2/2016 | Hardin ................ H04L 43/0876 709/224 |
| 2016/0234078 | A1* | 8/2016 | Jana ........................ H04L 47/30 |
| 2016/0285939 | A1* | 9/2016 | Behbahani ....... H04N 21/44209 |
| 2016/0286267 | A1* | 9/2016 | Tang .................. H04N 21/2383 |
| 2017/0026713 | A1* | 1/2017 | Yin .................... H04N 21/6587 |

OTHER PUBLICATIONS

Jiang, Junchen, et al., "DDA: Cross-Session Throughout Prediction with Application to Video Bitrate Selection", May 8, 2015, pp. 1-7.

Miller, Konstantin, et al., "QoE-Based Low-Delay Live Streaming Using Throughput Predictions", ACM Trans. Multimedia Comput. Commun. Appl., vol. 13, No. 1, Article 4, Oct. 25, 2016, pp. 1-24.

Mok, Ricky K.P., et al., "IRate: Initial Video Bitrate Selection System for HTTP Streaming", IEEE Journal on Selected Areas in Communications, vol. 34, No. 6, Jun. 1, 2016, pp. 1-15.

Pedregosa, Fabian, et al., "Scikit-learn: Machine Learning in Python", Journal of Machine Learning Research 12, 2011, pp. 2825-2830.

Powers, David M.W., "Powers, Evaluation: From precision, recall and f-measure to roc, informedness, markedness and correlation", Journal of Machine Learning Technologies, vol. 2, Issue 1, 2011, pp. 37-63.

Sun, Yi, et al., "CS2P: Improving Video Bitrate Selection and Adaptation with Data-Driven Throughput Prediction", SIGCOMM '16, Proceedings of the 2016 ACM SIGCOMM Conference, Aug. 22-26, 2016, pp. 272-285.

Unknown, Author, "Big Buck Bunny", Blender Foundation, http://peach.blender.org, pp. 1-6.

Unknown, Author, "Parametric bitstream-based quality assessment of progressive download and adaptive audiovisual streaming services over reliable transport", ITU-T SG12 Q14/12, http://www.itu.int/itu-t/workprog/wp_item.aspx?isn=9707, 2016, pp. 1-3.

Zia, Waqar, et al., "On Minimum Buffer Times and Bandwidth", Qualcomm Incorporated, Sapporo, Japan, Jul. 2014, pp. 1-7.

* cited by examiner

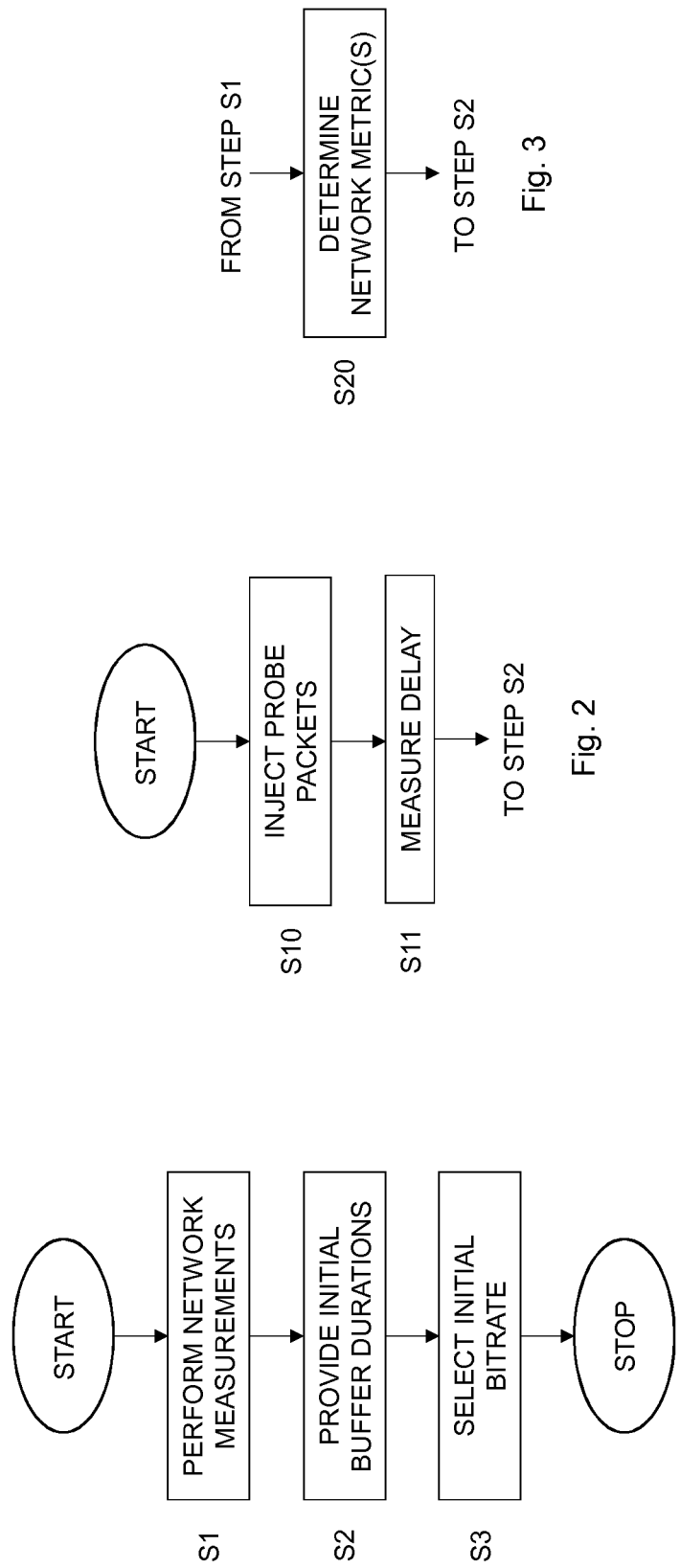

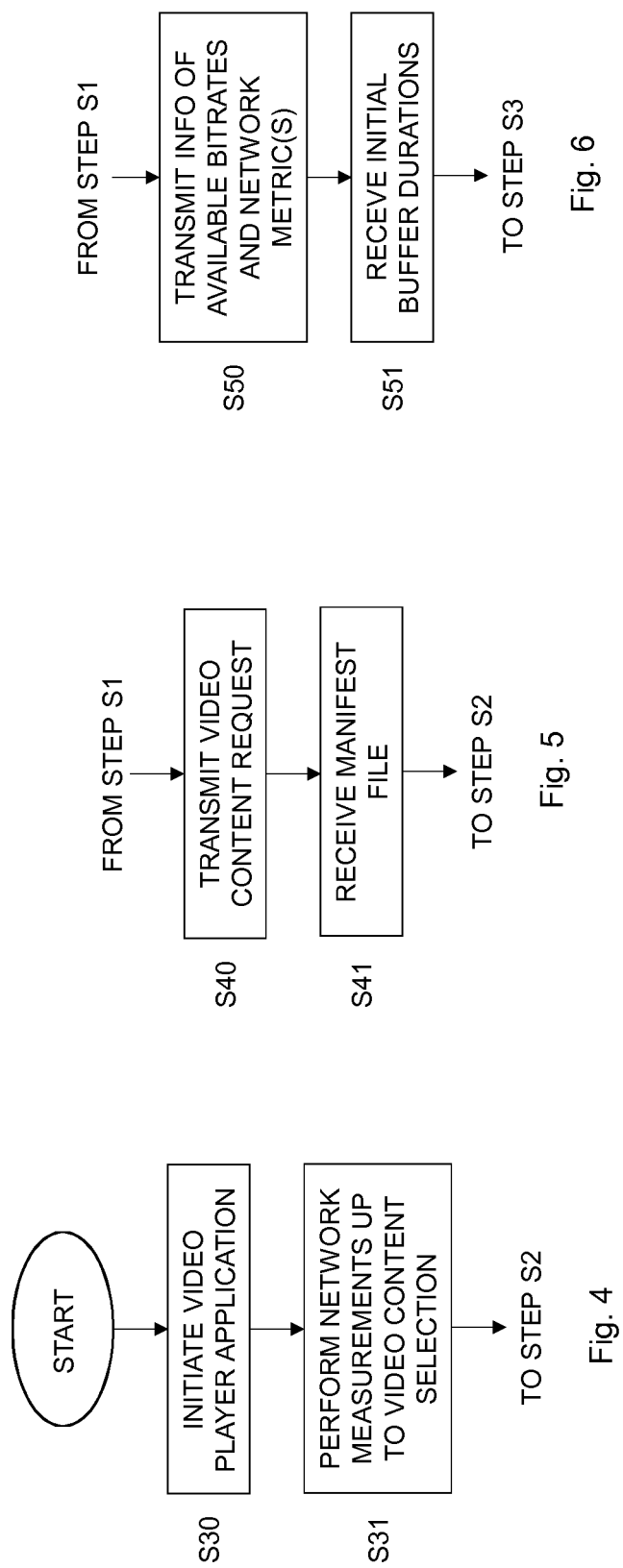

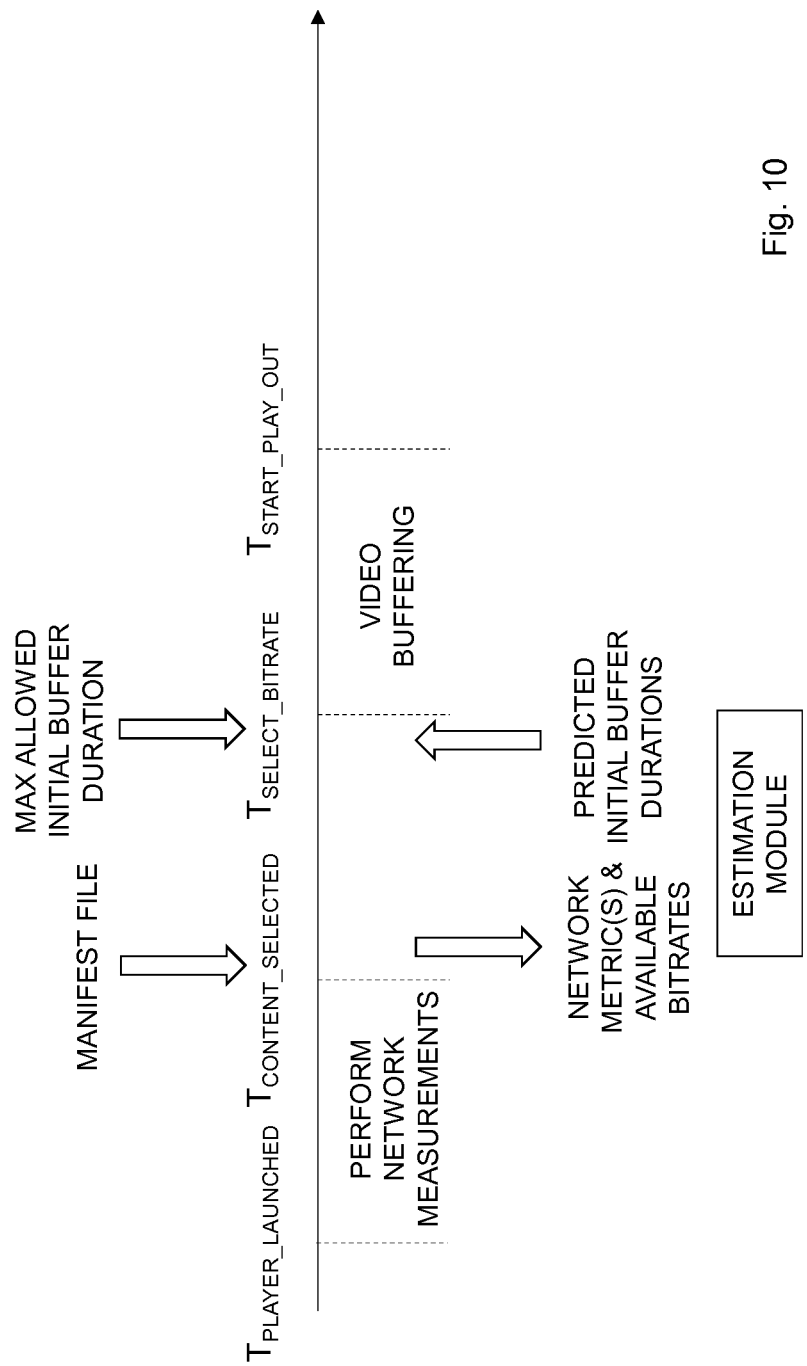

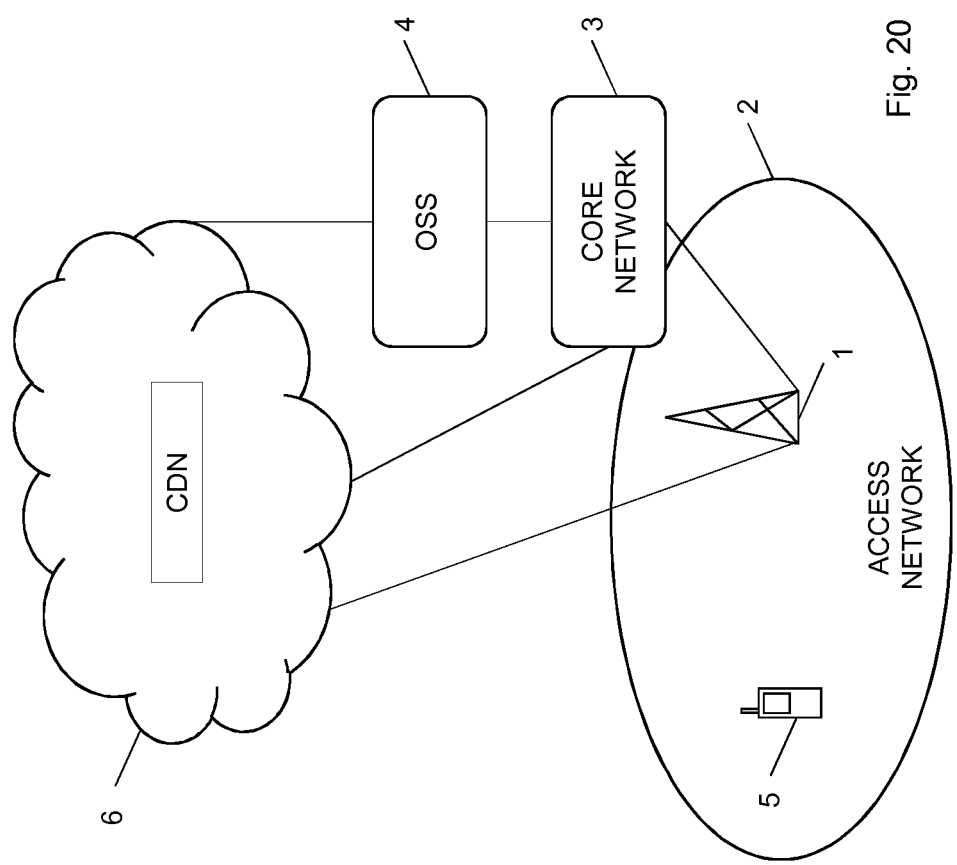

INITIAL BITRATE SELECTION FOR A VIDEO DELIVERY SESSION

TECHNICAL FIELD

The present embodiments are generally related to video delivery, and in particular to selection of initial bitrate for a video delivery session.

BACKGROUND

The Quality of Experience (QoE) on video delivery applications, such as video streaming applications, have become critical to the revenue of the service providers due to the high competition amongst them. This creates an incentive for service providers to provide their services in good quality in order to keep the existing customers engaged as well as to increase the number of subscribers. The QoE of mobile video streaming is highly influenced by the network conditions of user equipment and devices where the video services are running on. The variation of the perceived video quality is highly influenced by the quality variation of the mobile network link.

In the scope of video streaming, the join time, i.e., the time it takes for the video to start after the user initiates it, and the playout bitrate are known to be important influential factors on QoE. Users would ideally prefer to experience a video with a quality associated with low initial join time and a high video playout bitrate. A video that is streamed with a low bitrate often manifests a poor resolution of video in the presentation to the user.

These two important factors are considered to be interdependent since the choice of a certain bitrate might influence the join time in poor network conditions. In ideal network conditions, the network link has the capacity to handle high bitrates, and thus has little or no influence on the time it takes to fill the video buffer with video segments with any quality. However, a tradeoff may be observed when the network quality is poor, e.g., when the available throughput is not capable of delivering the video segment with a high requested bitrate.

Typically, a video content is composed of multiple video segments, where each video segment is decoded with different bitrates and are located in the Content Distribution Network (CDN) of the service provider. Depending on the throughput of the video packets being received into the playout buffer of the video player or client, the video client often adapts to one of the available bitrates and requests a video segment with a lower quality that can meet a particular latency requirement. There are various adaptive streaming algorithms that can be used by video clients, such as Dynamic Adaptive Streaming over HTTP (DASH), HTTP Live Streaming (HLS), and Smooth Streaming.

However, the decisions in those algorithms are often given based on the measurements in the application layer during a video stream, such as buffer length and throughput. Measurements during an ongoing video session does not help in choosing the initial bitrate, but only in the selection of the bitrates while the video is being played.

The existing adaptive streaming techniques necessitate passive measurement, and the measurements are performed on the video packets that are being transmitted to the video client. If there is no packet transmission, there is no measurement. Thus, adaptive streaming is applicable on all bitrate selections during a video stream except for the first one, i.e., the initial bitrate. It is often challenging to choose the initial bitrate, and this is often done randomly; sometimes while being aggressive towards high bitrates especially when the network quality is good. If the network quality is not capable of handling the bitrate requested by the video client, then the initial buffer duration tends to increase since this makes the adaptive streaming algorithm lowering the bitrate and re-request video packets that are encoded with lower bitrates. Thus, the number of downward bitrate switch events increases. The initial buffer duration is highly correlated with the initial waiting time of the user, thus impacting the QoE. Increased waiting time increases the energy consumption in the user equipment or device too. In addition, suboptimal initial bitrate selection would cause re-transmission of the same video content but at different bitrate levels causing both waste of traffic and energy over the network.

Documents [1, 2] disclose techniques for initial video bitrate selection for HTTP streaming. Basically, a server side solution is presented and implemented in the CDN. The techniques involve performing end-to-end active measurements in order to obtain path-quality metrics. These end-to-end active measurements are performed up to the point when the actual video content is being played out at the video client. The path-quality metrics are input to a decision tree that outputs a best initial bitrate.

SUMMARY

It is a general objective to provide an appropriate selection of initial bitrate for a video delivery session.

This and other objectives are met by embodiments disclosed herein.

An aspect of the embodiments relates to a method of initial bitrate selection for a video delivery session. The method comprises performing, by a user equipment and during a time window from initiation of a video player application in the user equipment up to selection of a video content, network measurements indicative of a current condition of a network to be used to deliver the video content to the user equipment. The method also comprises providing, for each bitrate available for the video content, a respective initial buffer duration predicted based on at least one network metric derived from the network measurements. The method further comprises selecting an initial bitrate for delivering the video content over the network to the user equipment based on said respective initial buffer durations.

Another aspect of the embodiments relates to a device for initial bitrate selection for a video delivery session. The device is configured to perform, during a time window from initiation of a video player application in a user equipment up to selection of a video content, network measurements indicative of a current condition of a network to be used to deliver the video content to the user equipment. The device is also configured to provide, for each bitrate available for the video content, a respective initial buffer duration predicted based on at least one network metric derived from the network measurements. The device is further configured to select an initial bitrate for delivering the video content over the network to the user equipment based on the respective initial buffer durations.

A further aspect of the embodiments relates to a device for initial bitrate selection for a video delivery session. The device comprises a measurement module for performing, during a time window from initiation of a video player application in a user equipment up to selection of a video content, network measurements indicative of a current condition of a network to be used to deliver the video content to the user equipment. The device also comprises a bitrate module for providing, for each bitrate available for the video content, a respective initial buffer duration predicted based on at least one network metric derived from the network measurements. The device further comprises a control module for selecting an initial bitrate for delivering the video content over the network to the user equipment based on said respective initial buffer durations.

Yet another aspect of the embodiments relates to a computer program comprising instructions, which when executed by at least one processor, cause the at least one processor to perform, during a time window from initiation of a video player application in a user equipment up to selection of a video content, network measurements indicative of a current condition of a network to be used to deliver the video content to the user equipment. The at least one processor is also caused to provide, for each bitrate available for the video content, a respective initial buffer duration predicted based on at least one network metric derived from the network measurements. The at least one processor is further caused to select an initial bitrate for delivering the video content over the network to the user equipment based on the respective initial buffer durations.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The present embodiments may increase the QoE of users by reducing the risk of improper initial bitrate that otherwise may cause bitrate switches until a suitable bitrate is found via existing bitrate adaptivity mechanisms, and thereby re-transmission of video content, waste of traffic and energy over the network and prolonged initial buffer durations.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of initial bitrate selection according to an embodiment;

FIG. 2 is a flow chart illustrating an embodiment of performing network measurements of the method shown FIG. 1;

FIG. 3 is a flow chart illustrating an additional, optional step of the method shown in FIG. 1 according to an embodiment;

FIG. 4 is a flow chart illustrating another embodiment of performing network measurements of the method shown FIG. 1;

FIG. 5 is a flow chart illustrating additional, optional steps of the method shown in FIG. 1 according to an embodiment;

FIG. 6 is a flow chart illustrating an embodiment of providing initial buffer durations of the method shown in FIG. 1;

FIG. 10 schematically illustrates, in a time line, steps of an embodiment of a method of initial bitrate selection;

FIG. 20 schematically illustrates a wireless, radio-based network comprising a user equipment and a CDN.

DETAILED DESCRIPTION

Figures 7, 8, 9, 13:
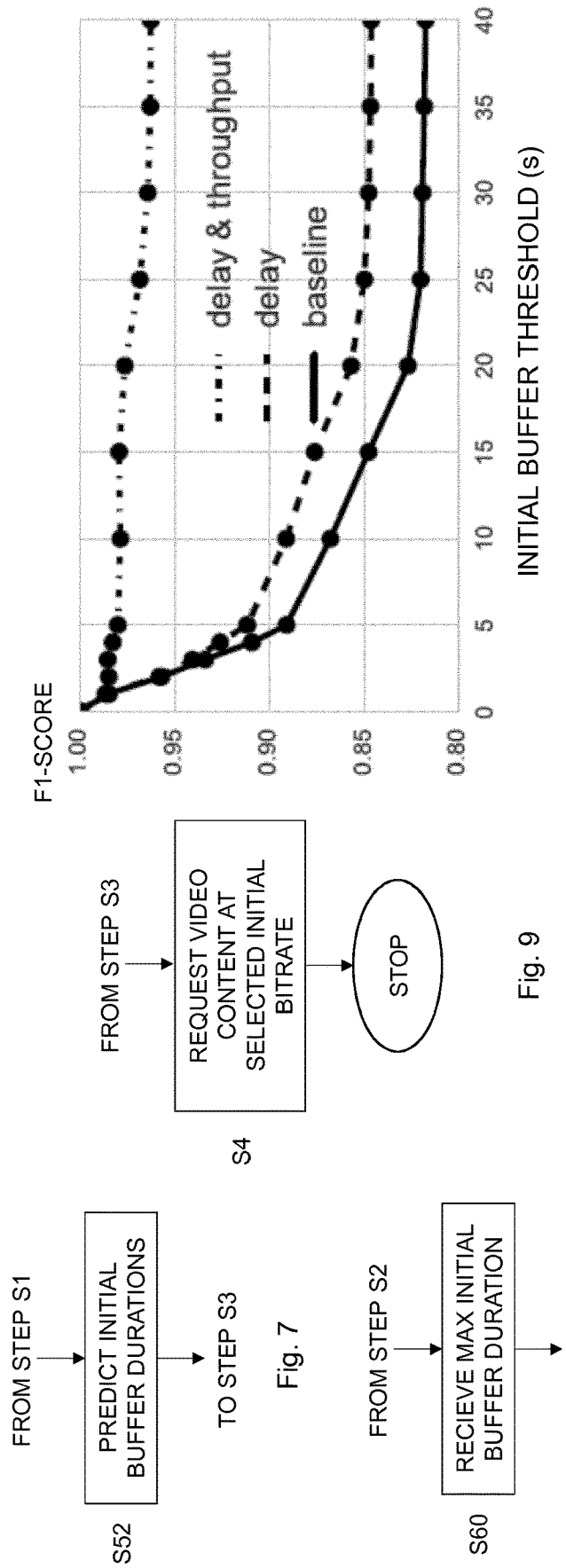
FIG. 7 is a flow chart illustrating another embodiment of providing initial buffer durations of the method shown in FIG. 1.
FIG. 8 is a flow chart illustrating an additional, optional step of the method shown in FIG. 1 according to another embodiment.
FIG. 9 is a flow chart illustrating an additional, optional step of the method shown in FIG. 1 according to a further embodiment.
FIG. 13 is a diagram illustrating a comparison of accuracies in predicting initial buffer duration in three tested scenarios using different network metrics.

Throughout the drawings, the same reference numbers are used for similar or corresponding elements.

The present embodiments are generally related to video delivery, and in particular to selection of initial bitrate for a video delivery session. A suitable selection of initial bitrate for a video delivery session, in particular video streaming session, according to the embodiments may solve shortcomings of the prior technology, in which the initial bitrate is generally set randomly or towards high bitrates. For instance, an initial bitrate as selected according to the embodiments may improve the QoE by reducing the waiting time and the join time. This is possible since the risk of performing downward bitrate switches and video packet retransmissions due to using an initial bitrate that the network is not capable of handling is significantly reduced by the embodiments. This further means that the embodiments may reduce the volume of wasted video packets by reducing the risk of retransmission of video packets with video content of another bitrate. The embodiments thereby also reduce the end-to-end energy consumption by relaxing the need for re-transmission of the same video content at different bitrate levels.

Documents [1, 2] propose a server implemented solution of selecting initial bitrates, e.g., a functionality implemented in the CDNs. The server implemented solution is based on end-to-end active measurements. However, such end-to-end active measurements are often not possible in practice due to large number of firewalls and hops in the routing path from a video content server in the CDN and the user equipment. Another limitation with the server implemented solutions in documents [1, 2] is that they necessitate adding extra functionality to all web servers and CDNs. Typically, CDNs are highly overloaded and execute heavy computations for other purposes involving optimization algorithms for load-balancing, domain name system (DNS) resolution, updating DNS tables to optimize the data stream amongst internal nodes, e.g., edge, replicator, source nodes, with many constraints. On top of this, running the selection of initial bitrates and the underlying computation for each video session on the CDN would add massive workload on the CDNs. Thus, the right place to run the prediction are within the user equipment. A further major limitation with the solutions in documents [1, 2] is that before a video content, and thereby a video source or asset, is selected by the user, the video client, i.e., video player application in the user equipment, does not know which CDN to connect to as it does not yet have a manifest file stating the video content and its location. Therefore, the measurements as proposed in documents [1, 2] can, in practical applications in which there are multiple CDNs and video service providers, only be initiated by the CDN-implemented functionality once the video content, and thereby video source or asset, has been selected by the user.

The initial bitrate selection of the embodiments is based on network measurements performed by the user equipment. This means that such network measurements can be initiated and performed before selecting and connecting to a particular CDN. These network measurements are used to provide an estimation of the initial buffer duration with respect to the different bitrate levels available for the video content. This enables the user equipment and the video player application, i.e., video client, therein to request the highest bitrate for the video content that would meet an expected initial buffer duration criterion.

FIG. 1 is a flow chart illustrating a method of initial bitrate selection for a video delivery session. The method comprises performing, in step S1 and by a user equipment, network measurements indicative of a current condition of a network to be used to deliver the video content to the user equipment. The network measurements in step S1 are performed by the user equipment during a time window from initiation of a video player application in the user equipment and up to selection of a video content. A next step S2 comprises providing, for each bitrate available for the video content, a respective initial buffer duration predicted based on at least one network metric derived from the network measurements. An initial bitrate for delivering the video content over the network to the user equipment is selected in step S3 based on the respective initial buffer durations.

The initial bitrate selection as shown in FIG. 1 is thereby based on network measurements performed by the user equipment. These network measurements probe the network and are thereby indicative of the current condition or state of the network. The user equipment performs the network measurements within a time window from the initiation or launch of the video player application, i.e., video client also referred to as video delivery or streaming application herein, in the user equipment up to the selection of a particular video content. This means that the network measurements are already performed and available once the particular video content is selected by the user.

At least one network metric is derived from the network measurements performed in step S1. This at least one network metric is used to predict a respective initial buffer duration for each bitrate available for the video content. Thus, a video content is typically available from a video source, such as a server of a video service provider in a CDN, in different bitrates. In particular, in DASH, HSL, Smooth Streaming and other adaptive streaming algorithms, the video content is composed of multiple video segments encoded at different bitrates. Accordingly, a respective initial buffer duration is then predicted for each such bitrate available for the current video content. For instance, a first initial buffer duration $D_1$ is predicted based on the at least one network metric for a first bitrate $R_1$, a second initial buffer duration $D_2$ is predicted for a second bitrate $R_2$ ($R_2 \neq R_1$), and so forth.

An initial bitrate for delivering or streaming the video content over the network to the user equipment is then selected in step S3 based on the initial buffer durations provided in step S2. This enables selection of a suitable initial bitrate based on the current network condition and thereby an initial bitrate that is adapted based on the current network condition and state. Accordingly, the risk of using an inappropriate initial bitrate causing bitrate switching events is thereby reduced. This will in turn improve the QoE by reducing the risk of long initial waiting time until the selected video content is played out at the user equipment.

In an embodiment, step S1 of FIG. 1 comprises the user equipment performing active network measurements during the time window.

Generally, active network measurements involve introducing data, i.e., packets, into the network. These packets, usually denoted probe packets, are timed as they travel through the network. This is in contrast to so called passive measurements, referring to the process of measuring a network condition without creating or inserting any extra traffic on the network.

FIG. 2 is a flow chart illustrating an embodiment of step S1 relating to such active network measurements. The method comprises the user equipment injecting, in step S10, probe packets into the network and then the user equipment measuring, in step S11, delays of the probe packets. The method then continues to step S2 in FIG. 1.

The active network measurements thereby involve injecting extra traffic, the so-called probe packets, for a short time interval and then recording the delay on the probe packets in the injected traffic. There are different embodiments available to inject extra traffic and probe packets during active network measurements. For instance, such embodiments include flooding based methods, packet pairs based methods, packet trains based methods, probe rate methods and probe gap methods. Actually, any active network measurement method can be used in the embodiment shown in FIG. 2 in order to obtain network measurements that are indicative of a current condition or state of the network.

The time interval during which the probe packets are injected is the previously mentioned time window from initiation of the video player application, i.e., video client, in the user equipment up to selection of the video content.

Instead of, or as an addition to, active network measurements so called passive network measurements can be used by the user equipment in step S1 to obtain network measurements indicative of the current condition of the network.

A video delivery session, such as a video streaming session, typically involves an authentication and/or authorization procedure. For instance, the user needs to authenticate to the video service provider to confirm his/her rights for streaming a particular video content before a video stream starts. The data communicated between the user equipment and the authentication and/or authorization server could then be used in passive network measurements. For instance, a time stamp on a packet from the user equipment during the authentication and/or authorization procedure, such as a time stamp on an authentication request packet could be used together with a time stamp on a packet received by the user equipment during the authentication and/or authorization procedure, such as a time stamp on the last packet received from the authentication and/or authorization server or a time stamp on the data packet containing the manifest file from the authentication and/or authorization server. The difference between these time stamps could then be used to derive a network metric, such as a delay value, descriptive of the current condition of the network.

Hence, in an embodiment step S1 of FIG. 1 comprises the user equipment performing network measurements on authentication and/or authorization data transmitted over the network between the user equipment and an authentication and/or authorization server.

Authentication and/or authorization data is a preferred example of data communicated between the user equipment and an external entity in the network during the time window from initiation of the video player application in the user equipment up to selection of the video content. Thus, passive network measurements may advantageously be performed on such authentication and/or authorization data. The embodiments are, however, not limited thereto. Actually any data sent from the user equipment or received by the user equipment over the network during the above mentioned time window could be used to perform such passive network measurements.

Thus, existing signaling and messages between the user equipment and an external server or other entity in the network could be utilized in passive network measurements, i.e., so called piggy-backing.

FIG. 3 is a flow chart illustrating an additional, optional step of the method shown in FIG. 1. The method continues from step S1 in FIG. 1 or step S11 in FIG. 2. A next step S20 comprises determining the at least one network metric based on the network measurements. The method then continues to step S2 in FIG. 1, where the initial buffer durations that are predicted based on the at least one network metric determined in step S20 are provided.

In an embodiment, the at least one network metric is determined in step S20 by the user equipment based on the network measurements as performed in step S1 of FIG. 1 or steps S10 and S11 of FIG. 2. In another embodiment, an external estimation module, to be described further herein, receives the results of the network measurements from the user equipment and this estimation module then determines the at least one network metric.

In an embodiment, step S20 of FIG. 3 comprises determining at least one throughput-based network metric and/or at least one delay-based network metric based on the network measurements Throughput, sometimes referred to as network throughput, is the rate of successful packet delivery over a communication channel or network link. Throughput is the bits per second in a network link, and is usually measured in bits per second (bit/s or bps), and sometimes in data packets per second (p/s or pps) or data packets per time slot. In a particular embodiment, throughput is a network metric in the packet level.

The throughput-based network metric could be one or more of a maximum throughput, i.e., highest throughput as determined for the network measurements during the time window; a minimum throughput, i.e., lowest throughput as determined for the network measurements during the time window; an average or mean throughput as determined for various network measurements during the time window and a standard deviation of throughput as determined for various network measurements during the time window. Instead of, or as an alternative to, the average throughput, the median throughput during the time window may be used as network metric.

The delay of a network specifies how long it takes for a bit of data to travel across the network from one node or endpoint to another. It is typically measured in multiples or fractions of seconds.

The delay-based network metric could be one or more of a maximum delay, i.e., highest delay as determined for the network measurements during the time window, a minimum delay, i.e., lowest delay as determined for the network measurements during the time window; an average or mean delay as determined for various network measurements during the time window may be used and a standard deviation of delay as determined for various network measurements during the time window. Instead of, or as an alternative to, the average delay, the median delay during the time window may be used as network metric.

In an embodiment, one network metric is determined in step S20, such as one of the network metrics mentioned above. However, in a preferred embodiment multiple, i.e., at least two, network metrics are determined in step S20. In a particular embodiment, step S20 comprises determining at least one throughput-based network metric and at least one delay-based network metric. In such a particular embodiment, at least one of maximum, minimum, average and standard deviation of throughput and at least one maximum, minimum, average and standard deviation of delay is determined in step S20.

The at least one network metric determined in step S20 is then used to predict the initial buffer durations. This prediction of initial buffer durations may based on other metrics in addition to network metrics determined based on the network measurements. An example of such additional metrics is the initial bitrates available for the video content and which may be retrieved from a manifest file as further described herein.

In such an embodiment, the prediction of initial buffer durations is based on the initial bitrates available for the media content and at least one network metric determined in step S20 based on the network metrics, such as at least one throughput-based network metric and/or at least one delay-based network metric.

Figure 14:
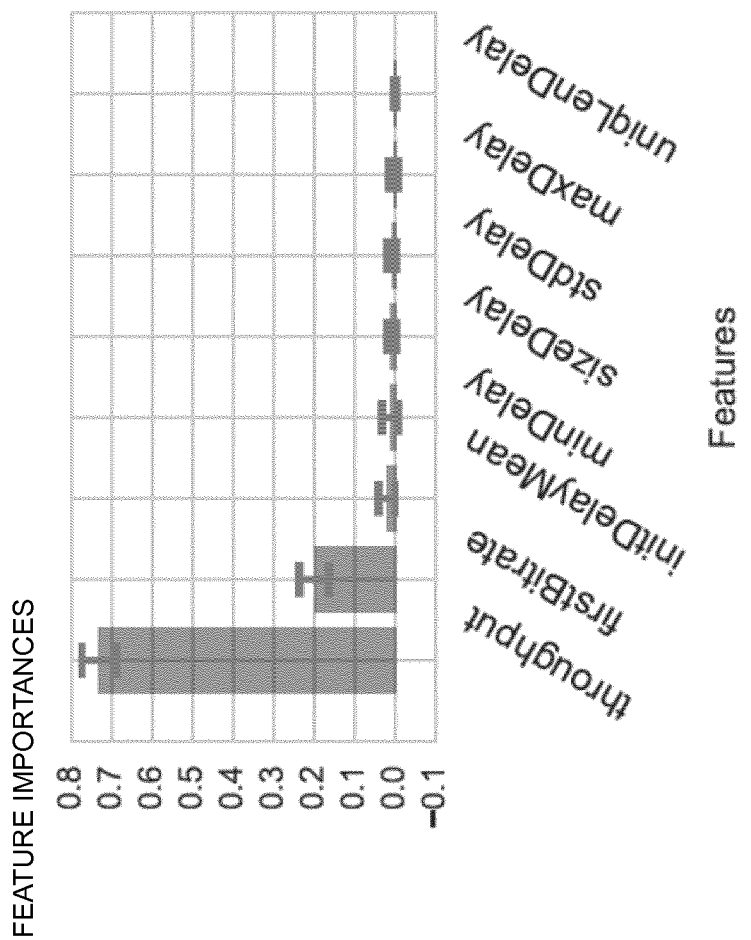
FIG. 14 is a diagram illustrating importance of features on the prediction of initial buffer duration.

FIG. 14, which will be described further herein, is a diagram listing importance of various network metrics in predicting initial buffer duration. As is seen from this figure, maximum throughput and initial bitrate are the two most important metrics with regard to predicting suitable initial buffer duration.

Bitrate is typically defined as the number of bits that are conveyed or processed per unit of time for a given application. The bitrates for all applications in a specific user equipment are expected to be equal to the packet throughput related to the applications. For a video player application there is a clear correspondence between the quality of the video and the required bitrate. A video with high resolution, i.e., many pixels; high framerate, i.e., many picture or frames per second; and/or a high quality setting for the video coding requires a higher bitrate than a low resolution video with low framerate and a low quality setting. "Bitrate" is therefore sometimes colloquially used as a synonym for "quality". This is, however, only valid when using a given video codec since different video codecs can produce video with different quality for the same bitrate. In an embodiment, the initial bitrate is the bitrates available for a video content selected by the user and may be defined in a manifest file.

In a particular embodiment, step S20 comprises determining maximum available throughput, average delay, maximum delay, minimum delay and standard deviation of delay based on the network measurements. In a further particular embodiment, these network metrics are used together with initial bitrate to predict the initial buffer durations.

In further embodiments step S20 comprises determining maximum throughput, minimum throughput, average throughput, standard deviation of throughput, maximum delay, minimum delay, average delay or standard deviation of delay based on the network measurements.

In other embodiments, step S20 comprises determining maximum throughput and minimum throughput; maximum throughput and average throughput; maximum throughput and standard deviation of throughput; maximum throughput and maximum delay; maximum throughput and minimum delay; maximum throughput and average delay; maximum throughput and standard deviation of delay; minimum throughput and average throughput; minimum throughput and standard deviation of throughput; minimum throughput and maximum delay; minimum throughput and minimum delay; minimum throughput and average delay; minimum throughput and standard deviation of delay; average throughput and standard deviation of throughput; average throughput and maximum delay; average throughput and minimum delay; average throughput and average delay; average throughput and standard deviation of delay; standard deviation of throughput and maximum delay; standard deviation of throughput and minimum delay; standard deviation of throughput and average delay; standard deviation of throughput and standard deviation of delay; maximum delay and minimum delay; maximum delay and average delay; maximum delay and standard deviation of delay; minimum delay and average delay; minimum delay and standard deviation of delay; or average delay and standard deviation of delay based on the network measurements.

In further embodiments, step S20 comprises determining maximum throughput, minimum throughput and average throughput; maximum throughput, minimum throughput and standard deviation of throughput; maximum throughput, minimum throughput and maximum delay; maximum throughput, minimum throughput and minimum delay; maximum throughput, minimum throughput and standard deviation of delay; maximum throughput, average throughput and standard deviation of throughput; maximum throughput, average throughput and maximum delay; maximum throughput, average throughput and minimum delay; maximum throughput, average throughput and average delay; maximum throughput, average throughput and standard deviation of delay; maximum throughput, standard deviation of throughput and maximum delay; maximum throughput, standard deviation of throughput and minimum delay; maximum throughput, standard deviation of throughput and standard deviation of delay; maximum throughput, maximum delay and minimum delay; maximum throughput, maximum delay and average delay; maximum throughput, maximum delay and standard deviation of delay; maximum throughput, minimum delay and average delay; maximum throughput, minimum delay and standard deviation of delay; maximum throughput, average delay and standard deviation of delay; minimum throughput, average throughput and standard deviation of throughput; minimum throughput, average throughput and maximum delay; minimum throughput, average throughput and minimum delay; minimum throughput, average throughput and average delay; minimum throughput, average throughput and standard deviation of delay; minimum throughput, standard deviation of throughput and maximum delay; minimum throughput, standard deviation of throughput and minimum delay; minimum throughput, standard deviation of throughput and average delay; minimum throughput, standard deviation of throughput and standard deviation of delay; minimum throughput, maximum delay and minimum delay; minimum throughput, maximum delay and average delay; minimum throughput, maximum delay and standard deviation of delay; minimum throughput, minimum delay and average delay; minimum throughput, minimum delay and standard deviation of delay; minimum throughput, average delay and standard deviation of delay; average throughput, standard deviation of throughput and maximum delay; average throughput, standard deviation of throughput and minimum delay; average throughput, standard deviation of throughput and average delay; average throughput, standard deviation of throughput and standard deviation of delay; average throughput, maximum delay and minimum delay; average throughput, maximum delay and average delay; average throughput, maximum delay and standard deviation of delay; average throughput, minimum delay and average delay; average throughput, minimum delay and standard deviation of delay; average throughput, average delay and standard deviation of delay; standard deviation of throughput, maximum delay and minimum delay; standard deviation of throughput, maximum delay and average delay; standard deviation of throughput, maximum delay and standard deviation of delay; standard deviation of throughput, minimum delay and average delay; standard deviation of throughput, minimum delay and standard deviation of delay; standard deviation of throughput, average delay and standard deviation of delay; maximum delay, minimum delay and average delay; maximum delay, minimum delay and standard deviation of delay; maximum delay, average delay and standard deviation of delay; or minimum delay, average delay and standard deviation of delay based on the network measurements.

In other embodiments, step S20 comprises determining maximum throughput, minimum throughput, average throughput and standard deviation of throughput; maximum throughput, minimum throughput, average throughput and maximum delay; maximum throughput, minimum throughput, average throughput and minimum delay; maximum throughput, minimum throughput, average throughput and average delay; maximum throughput, minimum throughput, average throughput and standard deviation of delay; maximum throughput, average throughput, standard deviation of throughput and maximum delay; maximum throughput, average throughput, standard deviation of throughput and minimum delay; maximum throughput, average throughput, standard deviation of throughput and average delay; maximum throughput, average throughput, standard deviation of throughput and standard deviation of delay; maximum throughput, standard deviation of throughput, maximum delay and minimum delay; maximum throughput, standard deviation of throughput, maximum delay and average delay; maximum throughput, standard deviation of throughput, maximum delay and standard deviation of delay; maximum throughput, maximum delay, minimum delay and average delay; maximum throughput, maximum delay, minimum delay and standard deviation of delay; maximum throughput, minimum delay, average delay and standard deviation of delay; minimum throughput, average throughput, standard deviation of throughput and maximum delay; minimum throughput, average throughput, standard deviation of throughput and minimum delay; minimum throughput, average throughput, standard deviation of throughput and average delay; minimum throughput, average throughput, standard deviation of throughput and standard deviation of delay; minimum throughput, standard deviation of throughput, maximum delay and minimum delay; minimum throughput, standard deviation of throughput, maximum delay and average delay; minimum throughput, standard deviation of throughput, maximum delay and standard deviation of delay; minimum throughput, maximum delay, minimum delay and average delay; minimum throughput, maximum delay, minimum delay and standard deviation of delay; minimum throughput, minimum delay, average delay and standard deviation of delay; average throughput, standard deviation of throughput, maximum delay and minimum delay; average throughput, standard deviation of throughput, maximum delay and average delay; average throughput, standard deviation of throughput, maximum delay and standard deviation of delay; average throughput, maximum delay, minimum delay and average delay; average throughput, maximum delay, minimum delay and standard deviation of delay; average throughput, minimum delay, average delay and standard deviation of delay; standard deviation of throughput, maximum delay, minimum delay and average delay; standard deviation of throughput, maximum delay, minimum delay and standard deviation of delay; standard deviation of throughput, minimum delay, average delay and standard deviation of delay; or maximum throughput, minimum throughput, average throughput and standard deviation of throughput based on the network measurements.

In further embodiments, step S20 comprises determining maximum throughput, minimum throughput, average throughput, standard deviation of throughput and maximum delay; maximum throughput, minimum throughput, average throughput, standard deviation of throughput and minimum delay; maximum throughput, minimum throughput, average throughput, standard deviation of throughput and average delay; maximum throughput, minimum throughput, average throughput, standard deviation of throughput and standard deviation of delay; maximum throughput, average throughput, standard deviation of throughput, maximum delay and minimum delay; maximum throughput, average throughput, standard deviation of throughput, maximum delay and average delay; maximum throughput, average throughput, standard deviation of throughput, maximum delay and standard deviation of delay; maximum throughput, standard deviation of throughput, maximum delay, minimum delay and average delay; maximum throughput, standard deviation of throughput, maximum delay, minimum delay and standard deviation of delay; maximum throughput, maximum delay, minimum delay, average delay and standard deviation of delay; minimum throughput, average throughput, standard deviation of throughput, maximum delay and minimum delay; minimum throughput, average throughput, standard deviation of throughput, maximum delay and average delay; minimum throughput, average throughput, standard deviation of throughput, maximum delay and standard deviation of delay; minimum throughput, standard deviation of throughput, maximum delay, minimum delay and average delay; minimum throughput, standard deviation of throughput, maximum delay, minimum delay and standard deviation of delay; minimum throughput, maximum delay, minimum delay, average delay and standard deviation of delay; average throughput, standard deviation of throughput, maximum delay, minimum delay and average delay; average throughput, standard deviation of throughput, maximum delay, minimum delay and standard deviation of delay; average throughput, maximum delay, minimum delay, average delay and standard deviation of delay; or standard deviation of throughput, maximum delay, minimum delay, average delay and standard deviation of delay based on the network measurements.

In other embodiments, step S20 comprises determining maximum throughput, minimum throughput, average throughput, standard deviation of throughput, maximum delay and minimum delay; maximum throughput, minimum throughput, average throughput, standard deviation of throughput, maximum delay and average delay; maximum throughput, minimum throughput, average throughput, standard deviation of throughput, maximum delay and standard deviation of delay; maximum throughput, average throughput, standard deviation of throughput, maximum delay, minimum delay and average delay; maximum throughput, average throughput, standard deviation of throughput, maximum delay, minimum delay and standard deviation of delay; maximum throughput, standard deviation of throughput, maximum delay, minimum delay, average delay and standard deviation of delay; minimum throughput, average throughput, standard deviation of throughput, maximum delay, minimum delay and average delay; minimum throughput, average throughput, standard deviation of throughput, maximum delay, minimum delay and standard deviation of delay; minimum throughput, standard deviation of throughput, maximum delay, minimum delay, average delay and standard deviation of delay; or average throughput, standard deviation of throughput, maximum delay, minimum delay, average delay and standard deviation of delay based on the network measurements.

In further embodiments, step S20 comprises determining maximum throughput, minimum throughput, average throughput, standard deviation of throughput, maximum delay, minimum delay and average delay; maximum throughput, minimum throughput, average throughput, standard deviation of throughput, maximum delay, minimum delay and standard deviation of delay; maximum throughput, average throughput, standard deviation of throughput, maximum delay, minimum delay, average delay and standard deviation of delay; or minimum throughput, average throughput, standard deviation of throughput, maximum delay, minimum delay, average delay and standard deviation of delay based on the network measurements.

In other embodiments, step S20 comprises determining maximum throughput, minimum throughput, average throughput, standard deviation of throughput, maximum delay, minimum delay, average delay and standard deviation of delay based on the network measurements.

The prediction of initial buffer durations may then be used based on any of the above mentioned embodiments of network metrics. In such a predictions also initial bitrates may be used in addition to the determined network metrics.

FIG. 4 is a flow chart illustrating an embodiment of step S1 in FIG. 1. This embodiment comprises the user equipment initiating, in step S30, the video player application based on a user-initiated application initiation signal. The method then continues to step S31, which comprises the user equipment performing, based on the user-initiated application initiation signal, the network measurements up to reception of a user-initiated video content selection signal. The method then continues to step S2 in FIG. 1 or step S20 in FIG. 3.

In this embodiment, the user initiates the network measurements by initiating, i.e., launching or activating, the video player application, i.e., video client, at the user equipment. For instance, the user may click on an icon or app to initiate the video player application on his/her user equipment. Such a click, or other form of activation action by the user, generates the so-called user-initiated application initiation signal. This user-initiated application initiation signal triggers and causes the user equipment to initiate the video player application and also to start performing the network measurements. Hence, the user-initiated application initiation signal indicates, in an embodiment, the start of the time window during which the user equipment performs the network measurements.

The user then browses available video content presented on a screen or display of or connected to the user equipment.

Once the user finds a video content that he/she would like to watch, the user typically clicks on a link or other representation of the video content to generate the user-initiated video content selection signal. This user-initiated video content selection signal not only causes the video player application to request the manifest file of the video content from the video service provider but also indicates, in an embodiment, the end of the time window for performing the network measurements.

FIG. 5 is a flow chart illustrating additional, optional steps of the method shown in FIG. 1. The method continues from step S1 in FIG. 1, from step S11 in FIG. 2 or step S31 in FIG. 4. A next step S40 comprises transmitting a request for the video content based on a user-initiated video content selection signal. A manifest file is then received in the step S41. This manifest file comprises information of the bitrates that are available for the video content. The method then continues to step S2 in FIG. 1 or step S20 in FIG. 3.

The user-initiated video content selection signal in step S40 is typically generated by the video player application upon the user clicking on a link or other representation of the video content as displayed on the screen of or connected to the user equipment as mentioned in the foregoing. The user-initiated video content selection signal also causes the video player application to generate a request for the video content, which is transmitted by the user equipment over the network to the video service provider. The user equipment receives, in response to the request, the manifest file from the video service provider.

A manifest file comprises information that directs a video player application to the location of the video streams of a video content in the CDN. In a typical embodiment, the manifest file is an initial or original manifest file of the video content received from an HTTP server that directs the video player application to additional manifest files for each of the encoded bitstreams of video content. The original manifest file also comprises information of the available bitstreams at differing bitrates of the video content.

This means that the manifest file can be used by the user equipment and the video player application as a source of the bitrates that are available for the video content selected by the user.

FIG. 6 is a flow chart illustrating an embodiment of step S2 in FIG. 1. The method continues from step S1 in FIG. 1, step S11 in FIG. 2, step S20 in FIG. 3 or step S31 in FIG. 4. A next step S50 comprises transmitting information of the bitrates available for the video content and the at least one network metric to an estimation module configured to predict initial buffer durations based on network metrics. The respective initial buffer durations predicted by the estimation module based on the at least one network metric are then received in step S51. The method continues to step S3 in FIG. 1, where the initial bitrate is selected based on the predicted initial buffer durations.

Hence, in this embodiment an estimation module performs the predictions of the initial buffer durations. This estimation module is, in this embodiment, implemented externally to the video player application and optionally externally to the user equipment. In a particular embodiment, the estimation module may be implemented in the network, such as in a network node, for instance in a network node within the same network as the authentication and/or authorization server or within the CDN, or in a server, such as in a server of the video service provider. In such a case, the user equipment transmits the information of the bitrates available for the video content selected by the user together with the at least one network metric to the estimation module. The information of the available bitrates is, in an embodiment, retrieved from the above-mentioned manifest file.

The estimation module uses the information of the available bitrates together with the network metrics to predict a respective initial buffer duration for each of the available bitrates as defined by the received information. The initial buffer duration is a prediction of the time required to buffer the initial video segment at the user equipment for each of the available bitrates. This prediction is, furthermore, performed based on the at least one network metric. It is also possible that the user equipment transmits the information of the available bitrates together with measurements data to the estimation module. The estimation module then preferably determines the at least one network metric based on the received measurement data and then uses the determined at least one network metric in predicting initial buffer durations for the available bitrates.

FIG. 7 is a flow chart illustrating another embodiment of step S2 in FIG. 1. The method continues from step S1 in FIG. 1, step S11 in FIG. 2, step S20 in FIG. 3 or step S31 in FIG. 4. A next step S52 comprises predicting, for each bitrate available for the video content, the respective initial buffer duration based on the at least one network metric. The method then continues to step S3 in FIG. 1.

In this embodiment, the prediction of the initial buffer durations is performed in the user equipment. Hence, no transmission of the information of the available bitrates and the at least one network metric is necessary as in the embodiment shown in FIG. 6. In clear contrast, the user equipment itself uses the at least one network metric to predict respective initial buffer durations for each available bitrate, such as defined in a manifest file.

In such an embodiment, the previously mentioned estimation module that performed the predictions based on the received network metric(s) could be regarded as being implemented in the user equipment rather than in the network or in a server. The user equipment then comprises the functionality necessary to predict initial buffer durations. The method as shown FIGS. 6 and 7 continues to step S3 in FIG. 1 where the initial bitrate is selected based on the initial buffer durations received in step S51 or predicted in step S52.

Regardless of implementing the prediction functionality locally in the user equipment as shown in FIG. 7 or remotely as shown in FIG. 6, the prediction of the initial buffer durations is preferably performed by a machine learning (ML) model. Thus, the estimation module preferably employs a ML model or algorithm that outputs predicted initial buffer durations for defined available bitrates based on input network metric(s). The ML model has then been trained to predict suitable initial buffer durations given input network metric(s). More information of such ML models and the training thereof is presented further below.

In an embodiment, the ML model is not only trained prior to usage in the method of selecting initial bitrate according to the embodiment. It is in fact possible to re-train the ML model during operation. This can be done according to various embodiments, such as online learning or batch-based learning.

In an embodiment, step S3 of FIG. 1 comprises selecting the initial bitrate based on the respective initial buffer durations and information of a maximum allowed initial buffer duration. In this approach a maximum allowed initial buffer duration is available at the user equipment. This maximum allowed initial buffer duration is then used together with the predicted initial buffer durations in order to select an initial bitrate for the selected video content.

In a particular embodiment, step S3 comprises selecting, among the bitrates available for the video content, a highest initial bitrate having a predicted initial buffer duration that is lower than the maximum allowed initial buffer duration.

For instance, assume that the initial buffer durations predicted based on the at least one network metric produce the result presented in Table 1 below.

TABLE 1

| | Predicted initial buffer durations | | | | |
|---|---|---|---|---|---|
| Bitrate (kbps) | 48 | 300 | 500 | 900 | 1500 | 2500 |
| Predicted initial buffer duration (s) | 5 | 7 | 8 | 14 | 17 | 25 |

Furthermore, assume that the maximum allowed initial buffer duration is set, in this example to, 10 s. Then, step S3 preferably comprises selecting 500 kbps as the initial bitrate since 500 kbps is the highest available bitrate that is predicted to result in an initial buffer duration that is lower than the maximum allowed initial buffer duration of 10 s.

The maximum allowed initial buffer duration can be set according to various embodiment. One such embodiment is shown in FIG. 8. This embodiment comprises receiving, in step S60, a user-initiated buffer duration signal defining the maximum allowed initial buffer duration.

Thus, in this embodiment the user selects the maximum allowed initial buffer duration that he/she is willing to accept when watching the current video content. This can be implemented by, for instance, displaying various alternative buffer durations on the screen of or connected to the user equipment. The user can then simply select one of these alternatives. The selection of a buffer duration alternative causes generation of the user-initiated buffer duration signal that is received by the user equipment in step S60 and used by the user equipment in step S3 of FIG. 1 to select initial bitrate.

In an embodiment, the user could select maximum allowed initial buffer duration each and every time he/she selects a video content to watch. In an alternative embodiment, the user equipment or the video player application stores information of any previous user-initiated buffer duration signal, i.e., previously selected maximum allowed initial buffer duration. In such a case, a same maximum allowed initial buffer duration as previously selected by the user is used for the current video content. This means that the same maximum allowed initial buffer duration could be used until the user makes a new selection of maximum allowed initial buffer duration.

In another embodiment, the maximum allowed initial buffer duration is defined based on the current video content selected by the user. For instance, the maximum allowed initial buffer duration could be defined based on the length or the duration of the video content. Generally, the shorter video content the lower maximum allowed initial buffer duration is preferably used. For instance, a user could well accept an initial buffer duration of say 30 s if he/she has selected to watch a 2 hour movie, but hardly accept such a comparatively long initial buffer duration when watching a 15 s video clip.

Instead of, or as a complement, to using video content length or duration to define maximum allowed initial buffer durations other characteristics of the video content could be used in the definition of maximum allowed initial buffer durations. For instance, longer maximum allowed initial buffer durations could be used for bought or rented movies as video content as compared to "home-made" user recorded video clips Further inputs for defining maximum allowed initial buffer duration include capabilities of the user equipment and/or video player application. For instance, the maximum allowed initial buffer duration could be defined given the type or version of user equipment and/or video player application and/or screen size of the screen of or connected to the user equipment.

FIG. 9 is a flow chart illustrating an additional, optional step of the method shown in FIG. 1. The method continues from step S3 in FIG. 1. A next step S4 comprises requesting the video content at the selected initial bitrate from a CDN. Thus, the video content is requested at the initial buffer duration as selected in step S3. In an embodiment, the video content is requested from the location as defined in the previously received manifest file.

FIG. 10 illustrates, in a time line, steps of an embodiment of a method of initial bitrate selection. The method generally starts by launching, initiating or starting a video player application or client at the user equipment ($T_{PLAYER\_LAUNCHED}$). The start of the video player application initiates network measurements. Thus, a set of initial active or passive network measurements is performed before the start of the video stream. This is basically during the time interval between the user launches the video player application and the video content to be played in the user equipment is selected by the user ($T_{CONTENT\_SELECTED}$). The selection of the video content by the user triggers a request for and reception of the manifest file for the video content from the video service provider. Next, the network metric(s) determined based on the network measurements are sent together with information of bitrates available for the video content, such as retrieved from the manifest file, to the estimation module. The estimation module returns the predicted initial buffer durations to the user equipment. In parallel, the user equipment provides the preference of the user, i.e., the user's maximum allowed initial buffer duration, i.e., user waiting tolerance. For instance, the user submits his/her preference in advance to the video player application via the user interface of the user equipment or video player application. A best available bitrate that would meet the user's waiting tolerance is then selected at $T_{SELECT\_BITRATE}$. The video content is requested at the selected initial bitrate, causing an initial buffering of the video content at the user equipment until the play out is started ($T_{START\_PLAY\_OUT}$).

The operation of the estimation module is very quick, generally only a few hundred of milliseconds. Accordingly, the process of predicting initial buffer durations will not negatively influence the initial buffer duration in terms of prolonging the initial buffer duration.

User perceived quality on services is critical to the revenue of service providers. A larger percentage of video streaming services are being watched on mobile terminals every day, while these mobile terminals are prone to high variation in network link quality. Adaptivity mechanisms in video player applications often operate based on measurements conducted only at the application layer without much network quality information, causing video players to choose suboptimal video bitrates. This choice of a suboptimal initial bitrate also impacts the temporal aspects such as video start time, i.e., join time, which in turn eventually impacts the QoE. Herein, a video player is studied with the focus on the initial buffer duration and the bitrate. We develop and deploy a ML model on a smartphone-based video player that helps to choose optimal bitrate in order to improve QoE. Our results show that QoE gain of approximately 20% can be achieved with a ML model as compared to a baseline implementation.

The QoE on video streaming applications have become critical to the revenue of the service providers due to the high competition amongst them. This makes service providers provide their services in good quality in order to keep the existing customers engaged as well as to increase the number of subscribers. The QoE of mobile video streaming is highly influenced by the network conditions of devices where the video services are running on. The variation of the perceived video quality is highly influenced by the quality variation of the mobile network link. In the scope of video streaming, the join time, i.e., the time it takes for the video to start after user initiates it, and the playout bitrate are known to be important influential factors on QoE. Users would ideally prefer to experience a video with a quality associated with low initial join time and a high video playout bitrate. A video that is streamed with a low bitrate often manifests a poor resolution of video in the presentation to the user.

Typically, a video source is composed of multiple video segments, where each video segment is decoded with different bitrates and are located in the CDN of the service provider. Depending on the throughput of the packets being received into the player playout buffer, the video clients often adapt to one of the available bitrates and request a video segment with a lower quality that can meet a particular latency requirement. There are various adaptive streaming algorithms to do that in the video client such as DASH, however, the decisions in those algorithms are often based on the measurements in the application layer during a video stream, such as buffer length and throughput. Measurements during a video stream do not help in choosing the initial bitrate, but only in the selection of the bitrates while the video is being played. Similar measurements higher up in the stack might not be optimal, as it might take adaptive decisions too late. Suboptimal initial bitrate selection causes downwards initial bitrate switch events on the video client, even before the start of the video stream, that might be causing high initial buffering time. We refer to the initial buffering as the time difference between when the first buffering starts and when it stops.

Herein, we study the initial buffering time, the initial video bitrate, and the QoE on a smartphone-based video player. We aim to reduce the initial buffering time of a video stream while keeping the video bitrate as high as possible. We do this by using additional network metrics and we record the network metrics, such as delay, on the smartphone, then provide the values of these network metrics as features to a supervised ML algorithm. This enables the video player to decide on the best initial bitrate for various tolerances on initial rebuffering time. We show the tradeoff between the bitrate and the buffer duration in situations where the network quality is not excellent.

Latency in Initial Bitrate Adaptation

During a video session, a set of events occur sequentially, and these events are recorded together with their timestamps. We will here describe a typical sequence of events. First a video bitrate is chosen by the video client, and the video segments with the chosen bitrate are requested by the video client from the remote video content or service provider. Then, the video segments with the requested video bitrate are sent to the video client in chunks of IP packets. Typically, the video starts buffering these video segments and triggers the buffering started event, and then when the buffer is filled with the segments, the buffering stopped event is recorded. The video client, based on the throughput of the incoming data chunks over the network, adapts the bitrate such that the video is being streamed and presented to the user without any stalling events, i.e., freezes. This helps to improve the video quality perceived by the user since the stalling events are known to be one of the most undesired temporal artifacts in a video stream. This adaptation can also occur in the beginning of the video stream such that if the requested video segment does not meet the deadline implemented in the player, i.e., if the video segments arrive later than the expected time interval then the video client asks for a lower bitrate. This eventually extends the time it takes for the video player to start presenting the video to user, i.e., extends the join time, and eventually might impact negatively the perceived quality on a video stream.

Existing Adaptivity Issues Based on User Data

In a large set of data collected both on live (N=4,936,699) and Video On Demand (VoD) (N=5,142,578) video sessions, we observed that 1.2% to 3.9% of the video sessions were associated with initial buffer durations higher than 10 s and with initial bitrates chosen by the video player higher than 1 Mbit/s. Of those sessions 0.1% to 3.1% were shorter than 2 minutes long, indicating that the users might have given up watching the video due to the long initial buffer time early in the video stream. Thus, from the dataset, a potential improvement can be achieved if a lower bitrate (less than 1 Mbit/s) is selected by the video player to reduce the initial buffer duration, which eventually could reduce the ratio of the users that gives up watching a video.

The dataset was dominated by samples that were recorded on devices that were connected to either a fixed network or a home WiFi access point. Thus, the overall quality of the underlying network is not expected to be poor. We expect that a higher percentage of suboptimal bitrate selection cases would exist in cellular based mobile streaming. This motivates us to study the choice of initial bitrate, as it might play a crucial role in the join time when the network link quality is not ideal.

Figure 11:
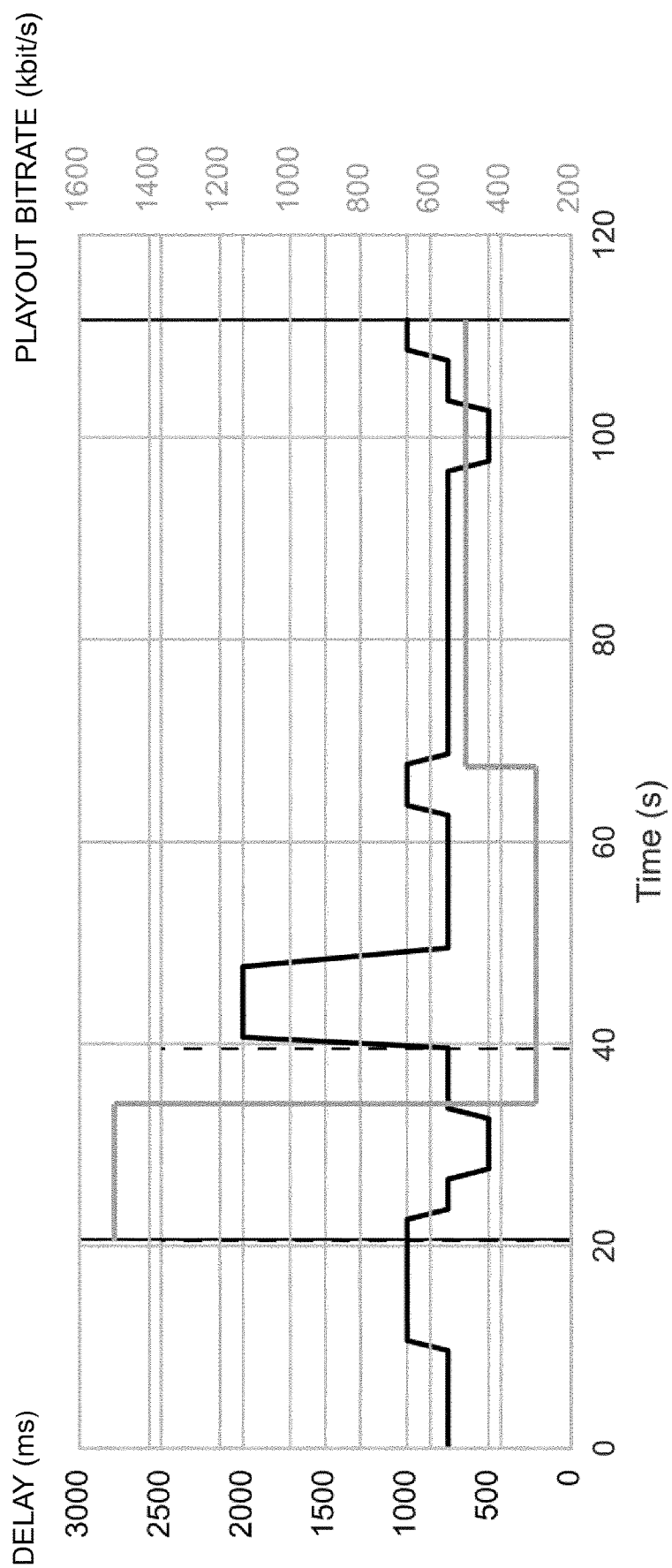
FIG. 11 schematically illustrates a snapshot of delay and playout bitrate during a video stream.

In FIG. 11, the player events are illustrated for a video session with corresponding delay values. The vertical solid black lines are the play start and end times, respectively. In this example, the user initiates a video stream at t≈20 s. The vertical dashed lines (one overlapping with the start time, and the other approximately located at t=40 s) are the buffering start and buffering stop event times. In this example, the initial buffer duration was approximately 20 s long and up until the buffer stopped event no video pictures were presented to the user. The gray line represents the bitrate values (the values are presented in the right hand side y-axis), and in this example, 1500 kbit/s initial bitrate was selected by the player, and at approximately t=35 s the bitrate switched to 300 kbit/s. After t=60 s the bitrate slightly increased to 500 kbits and was kept at that bitrate until the end of the video. The black solid line that is fluctuating throughout the video stream depicts the active delay measurement (the values are given in the left hand side y-axis). Both the high magnitude and the large variation of the delay can be used as one indicator for the low bitrate. In the case of high delay values, there are multiple downwards bitrate switch events due to the fact that the network conditions make it difficult for the video segments to be received in the video playback buffer within the expected time interval. The video player then retries the fetch with reduced bitrates. The correct choice of initial bitrate based on the delay metric might reduce the number of bitrate switches, which eventually might reduce the join time. In this example, a better choice of initial bitrate could be 300 kbit/s, as the time between when the bitrate switch for 300 kbits and the buffering stop time is rather small (around 5 s).

Figure 12:
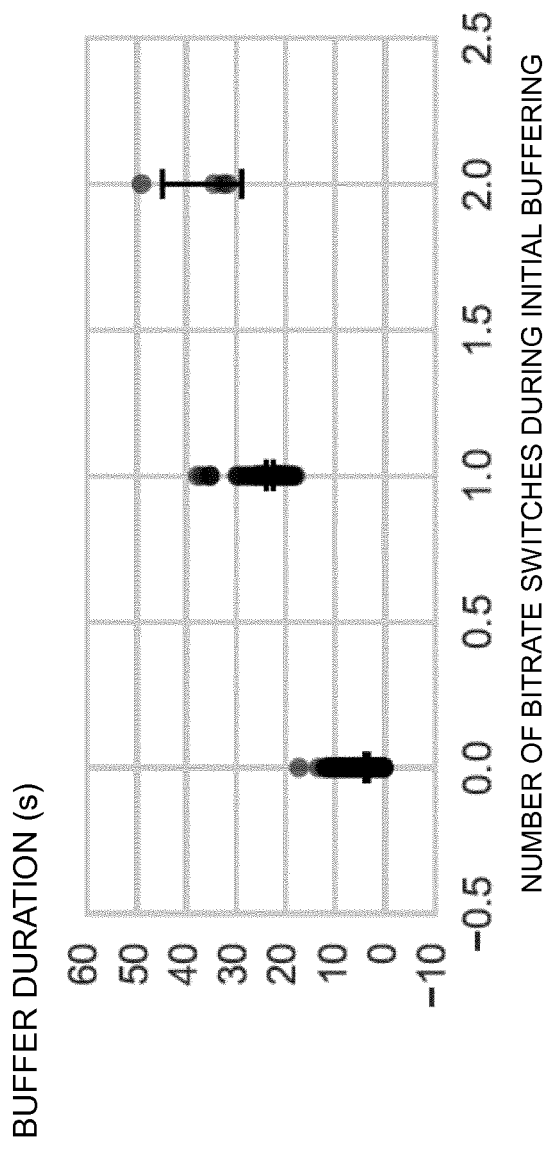
FIG. 12 is a diagram illustrating the relation between buffer duration and bitrate switch events.

The relation between the number of downwards bitrate switches and the initial buffering time is given in FIG. 12. The data presented in the figure was collected on a video player when it selected a random initial bitrate. The lines that are vertical to the y-axis are the corresponding 95% confidence intervals. It can be observed that the mean initial buffer duration increased by more than ten-folds with a single bitrate switch event. Looking at the initial bitrate and initial buffer duration from the video sessions, we have not observed a clear correlation between the bitrate and the initial delay, probably due to the corresponding network conditions. We have also observed that in the video player we have tested, the highest bitrate is chosen when the smartphone is connected to the Internet via the WiFi interface. This indicates that the decision is taken only based on the active network interface of the mobile device, and no network measurements are considered. This makes sense if the WiFi users are assumed to be connected to WiFi hotspot mostly at home, and those hotspots are shared by small number of other devices. This choice might not be an optimum one in the case of public WiFis, such as in hotels or similar occasions where the network quality is varying.

Approach Overview

The aforementioned observations motivated us to find a good way to predict initial buffer durations for various bitrates using additional network metrics. As there are many features, an ML approach is a good choice. We modified the original source code of the video client such that in addition to the application events triggered by the video client, it also records additional network parameters, such as delay and bitrate. The video player collects a few metric samples (approximately 8 samples), and a set of aggregations of this metric, or these metrics in case there are several, is provided as input to the ML model. We have compared three different scenarios to address the importance of the network features, i.e., network metrics, in the prediction accuracy. In Scenario 1, only initial bitrate was used as a feature to predict the initial buffer duration. In Scenario 2, in addition to the bitrate the delay metric was added to the model; and in Scenario 3 both the delay and maximum throughput metrics were involved in the model. The exact network metrics that were used in the scenarios are given in Table 2. We performed the experiments with Big Buck Bunny video clip [3], that was available in the streaming server with six different bitrate levels: {48, 300, 500, 900, 1500 and 2500} kbit/s, where 48 kbit/s is only audio stream.

TABLE 2

Tested features

| Scenario | Features |
| --- | --- |
| Scenario 1 | initial bitrate |
| Scenario 2 | Scenario 1 + average delay, maximum delay, minimum delay, delay sample count, stddev of delay, unique delay sample count |
| Scenario 3 | Scenario 2 + maximum throughput |

Identifying the Important Network Features

Finding out the important features that influence QoE can be done in various approaches, such as observing the variation of the prediction with respect to the variation of one feature at a time or by observing the change in the prediction accuracies with various feature sets. We chose the latter adding new features method, and prepared feature sets for three different above mentioned scenarios. We applied a supervised binary classification problem, random forest, as it is known to be powerful on most cases. Various buffering deadline thresholds were set: {0, 2, 5, 10, 15, 20, 25, 30, 35 and 40} s. The predicted buffer duration values that were less than a threshold value were marked as 0, otherwise 1. As a performance metric, f1-score was used, and the f1-score was calculated for all threshold values for the three scenarios [4]. The measurements were collected while video streaming experiments were performed in five different network conditions, such that the maximum throughput, $R_{max}$, was set to 300 kbit/s, 600 kbit/s, 1200 kbit/s, 2400 kbit/s, and 4800 kbit/s. In the training phase, we modified the source code of the video client such that it chose a random initial bitrate at the start of the video stream. After this the corresponding video client events and the network measurements were collected in the video client terminal. Then, the random forest ML model was trained. The models were validated and the three scenarios were compared via 10-folds cross-validation.

Deployment of the ML Model to the Client

This problem was also addressed as a regression problem, where the aim of the model was to predict the exact value of the initial buffering time using a set of above mentioned features. After the model was trained, the model was deployed in a server, denoted estimation module herein, that was located in the same network with the smartphone. The communication between the server and the smartphone was handled via a REST API. The video client recorded network measurements and sent the network metrics to the server running the ML model. In the model we then kept all network metrics received from the video client fixed except for the bitrate. Instead we let the bitrate feature loop over all available bitrate values, and let the model calculate initial buffer duration values for each of the bitrate values. This information, i.e., a list of all available bitrate values and the corresponding initial buffer duration values, was then sent to the video client. The video client scanned all the bitrates and the corresponding features and selected the highest initial bitrate that matches the maximum initial buffer duration criteria. The video client then asked for the video segments that existed with the selected bitrate from CDN. This way, the initial buffering time of the video client was expected to be reduced.

Buffer Duration and the Number of Bitrate Switches

A suboptimal choice of initial bitrate causes downwards bitrate switches when the network quality cannot meet the bitrate requirements, which eventually causes high initial buffer time. In Table 3, the measured initial buffer duration values are given with the corresponding choice of initial bitrates for five different types of experiments. Here, the type of experiment is indicated with E, and $R_{max}$ is the maximum set throughput. The number of downwards bitrate switches in a session is given by S, while N is the number of sessions. For example in row 1 (i.e., E=1), the values S=1 and N=37 indicate that there are 37 sessions with one downwards bitrate switch. The measured mean initial buffer duration is given by $T_{buf}$, while $\bar{B}$ is the measured mean bitrate. Similarly, $\bar{D}$ is the measured initial delay. Recall that all the experiments in this part were performed when the initial bitrate was randomly selected. For experiment types 4 and 5 (E=4, E=5), the initial buffer durations were measured to be less than 5 s, and as these experiments corresponds to high throughput upper bounds, the initial delay values are also measured to be less than 50 ms. These two types are actual when the perceived quality is expected to be high, and it is more interesting to study the regions with poorer quality. The number of sessions with at least one downwards bitrate switch exists when the requested initial bitrate is higher than $R_{max}$, as expected.

TABLE 3

Overall stats of scenarios

| E | $R_{max}$ (kbit/s) | S | $\overline{T}_{buf}$ (s) | $\overline{B}$ (kbit/s) | $\overline{D}$ (ms) | N |
|---|---|---|---|---|---|---|
| 1 | 300 | 1 | 23.1 | 872.9 | 537.9 | 37 |
| 2 | 600 | 0 | 8.3 | 370.6 | 114.4 | 17 |
| 2 | 600 | 1 | 23.5 | 1462.5 | 183.2 | 16 |
| 2 | 600 | 2 | 36.9 | 1600.0 | 174.0 | 4 |
| 3 | 1200 | 0 | 6.9 | 640.7 | 91.0 | 27 |
| 3 | 1200 | 1 | 21.1 | 2100.0 | 274.4 | 10 |
| 4 | 2400 | 0 | 4.1 | 905.4 | 38.3 | 37 |
| 5 | 4800 | 0 | 2.6 | 1100.0 | 43.4 | 37 |

Important Features Influencing the Initial Buffer Duration

The f1-scores for the three cases are compared as given in FIG. 13. A baseline was considered if the initial buffer duration was predicted in Scenario 1, only with the initial bitrate. In Scenario 2, delay relevant metrics were added to the feature set and the model is re-trained; and in Scenario 3, in addition to Scenario 2, maximum throughput was added to the feature set. A binary classification was applied with varying thresholds: 0 s, 1 s, 2 s, 4 s, 5 s, 10 s, 15 s, 20 s, 25 s, 30 s, 35 s, and 40 s. Classification algorithm tried to predict whether or not the initial buffer duration was less than or equal to the given threshold. The f1-scores for the three scenarios showed that there was an improvement in the prediction accuracy if the network metrics were used, especially in the region where the buffer duration was higher than 5 s. Given that the buffer duration can be minimum approximately between 2 s to 5 s in the best network conditions, it is expected to see this region where the improvement is achieved.

Amongst the measurable metrics in the Android client that we have considered in this study, the maximum throughput, initial bitrate, and the mean initial delay were the top three metrics that help to predict the initial buffer duration. In FIG. 14, the importance of the features is given. The importance of the features was computed with the random forest considering the average decrease in the impurity with respect to each feature.

The overall performances for all experiments are given in Table 4 via three different performance metrics. The dataset contained 185 samples containing equal samples (N=37) from each experiment type. The Mean Absolute Error (MAE) value decreased from 7.98 to 5.06 (36% decrease); the Mean Square Error (MSE) decreased from 89.77 to 51.92 (42% decrease), and $R^2$ increased from 0.07 to 0.47 (almost no correlation to some correlation), when the delay metric was considered in addition to the bitrate. If the maximum throughput metric was also considered together with the delay and the bitrate, these accuracy metrics improved even further as shown in Table 4. This quantifies the importance of additional network metrics in prediction of the initial buffer duration.

TABLE 4

Comparison of accuracies in predicting the initial buffer duration in different scenarios

| Row | MAE | MSE | $R^2$ | Scenario |
|---|---|---|---|---|
| 1 | 7.98 | 89.77 | 0.07 | baseline |
| 2 | 5.06 | 51.92 | 0.47 | delay |
| 3 | 4.83 | 50.0 | 0.48 | throughput & delay |

Prediction of the Initial Buffer Duration

The predictions and the corresponding ground truth values for Scenarios 2 and 3 were computed. In experiments conducted with maximum throughput of 300 kbit/s, the span of the buffer durations was above 15 s, causing a too bad streaming quality and thus not covering the whole range of possible initial buffer duration values. Experiments with maximum throughput of 2400 kbit/s and 4800 kbits yielded a too good streaming quality with all of the buffer durations below 10 s and again not covering the full range of possible buffer duration values. Only in experiments with maximum throughput of 600 kbit/s and 1200 kbit/s, we observed the buffer duration in full range. A sensitivity analysis was applied to the model to understand its behavior with respect to different initial buffer duration values. This was done by changing one parameter at a time, and observing the predicted output.

The predicted buffer duration increased with the initial delay. The behavior of the model is complex; when changing the initial delay only while keeping the other features constant, the predicted buffer duration did not span the full range from 0 s to approximately 30 s. The reason for this could be that the model was built with eight features, and the initial bitrate is only one of them. It could be due to that the concurrent variation of multiple features in the model, and the inter-dependency amongst them. Still, the predicted initial buffer duration values increased with the mean initial delay.

Implementation of the Model on the Video Client and Validation of the Model

The model was implemented in the video client, and then validated in further tests. The model was deployed in a remote server running a script supported by a Python scikit learn library [5]. The mobile client recorded delay measurements and throughput for a small interval, and then sent these metrics along with the possible available bitrate values belonging to the intended video source to the remote server, i.e., the estimation module. The server then used these metrics as input to the ML model, and provided a table of predicted buffer duration for all available bitrates for that video source. The player received these metrics and based on the maximum allowed initial buffer duration that was set by the user, it chose the highest computed bitrate based on the model output.

A Tradeoff Between the Initial Bitrate and the Initial Buffer Duration

The gain in the initial buffer duration and the bitrate was compared with the current implementation of the video player. It has been observed that the video player selects the highest possible bitrate when the connection to the Internet is via the WiFi interface in the mobile terminal. The comparisons were also made against the scenario when a random initial bitrate was selected by the player. Baseline 1 was for the case when a highest initial bitrate was chosen, and baseline 2 was when a random initial bitrate was chosen. The baselines were then compared to cases when different initial buffer duration tolerance values were set in the client within the range from 5 s to 20 s.

1) Baselines: The baseline can vary with the network conditions. To see that, we have first set the maximum throughput to 4800 kbit/s and let the video client on the smartphone choose the highest initial bitrate possible. The mean initial bitrate was 2500 kbit/s (as it was the maximum available bitrate for the sequence under test) with a mean initial buffer duration of 5 s. In this scenario, no downwards bitrate switches were observed. Then, we reduced the maximum throughput to 1200 kbit/s with the same settings. This time, the initial buffer duration increased to 21.8 s, due to the increased number of downwards bitrate switches (0 to 1.1) in the beginning of the video sessions. The bitrate switched from 2500 kbit/s to some bitrate values below 1200 kbit/s. Thus, the aim was to see example sessions in the dataset where the choice of initial bitrate was higher than the maximum throughput such that the dataset would have the potential to contain downwards bitrate switch events causing high initial buffer durations. It has been observed in the figure that if the highest bitrate was selected, baseline 1, by the video player, then the mean initial buffer duration exceeded 20 s with a session bitrate of 859 kbit/s, which would highly impact QoE. When a random bitrate was selected, baseline 2, the initial buffer duration was decreased to approximately 11 s with a mean bitrate of 1000 kbit/s. The comparisons are summarized in Table 5. In throughput ranges around 1200 kbit/s, choosing highest bitrates instead of random bitrate increased the initial buffer duration by approximately 90%, while the initial bitrate is increased by 24%.

is often used in high-level motion video sequences, and 1 for slow motion. We used motion level 2, as the motion level of the video we used, Big Buck Bunny, is neither too low or too high. The motion level and the frame height and width highly influences the Mean Opinion Score (MOS) gain. We have assumed the following resolutions: 426×240, 426×240, 640×360, 852×480, and 1280×720 for 300, 500, 900, 1500, and 2500 kbit/s video bitrates, respectively.

Performance Comparison of Models and QoE

To evaluate the performance of the models and estimate their QoE we have used a version of Ericsson's QoE model submission to the ITU P.1203 competition [7]. From this model we obtained a MOS, which was an estimate of the perceived video quality from the user's perspective. The MOS values ranged from 1 to 5, where 1 is the lowest perceived quality and 5 is the highest perceived quality.

We have compared the overall statistics and the QoE in between all scenarios including the two baselines, as given in Table 5. The first two rows present the mean initial and the session bitrate, respectively. Third and fourth rows are the mean initial buffer duration and the mean session buffer duration. Row 5 is the ratio of the sessions where no bitrate switches occurred. Rows 6 and 7 are the mean up- and down-switch counts per session, respectively. The MOS values for each scenario are given in row 8. Row 9 and 10 are the maximum throughput set for each scenario, and the number of samples for each scenario. The MOS increased from 2.35 to 2.79, which was an increase in the QoE with about 18% compared to baseline 2. If the user is tolerant to 20 s of initial buffer duration, the QoE gain increased to MOS value of 2.86 (21% improvement). If the player chose the highest bitrate as compared to a random bitrate selection,

TABLE 5

Comparison of model with the baseline in video player

| | Minimum initial buffering duration threshold | | | Video player | | |
|---|---|---|---|---|---|---|
| | Max 10 s | Max 15 s | Max 20 s | Random bitrate | Highest bitrate | |
| $\overline{B}_{init}$ (kbit/s) | 500 | 900 | 1500 | 952 | 2500 | 2500 |
| $\overline{B}_{sess}$ (kbit/s) | 500 | 860 | 881 | 695 | 859 | 2500 |
| $T_{initbuf}$ (s) | 5.49 | 9.88 | 21.37 | 11.41 | 21.78 | 5.03 |
| $T_{sessbuf}$ (s) | 5.07 | 10.77 | 21.2 | 10.8 | 21.75 | 4.36 |
| % zero bitrate switch | 100 | 92 | 3 | 70 | 0 | 100 |
| $N_{upswitch}$ | 0 | 0.08 | 0 | 0.35 | 0 | 0 |
| $N_{downswitch}$ | 0 | 0.21 | 1.08 | 0.39 | 1.1 | 0 |
| MOS | 1.87 | 2.79 | 2.86 | 2.35 | 2.80 | 4.27 |
| $R_{max}$ | 1200 | 1200 | 1200 | 1200 | 1200 | 4800 |
| No. or sessions | 79 | 57 | 70 | 31 | 108 | 22 |

2) Model on different initial buffer tolerance: When the maximum allowed initial buffer durations by the video clients, i.e., the upper bound thresholds, were set to 5 s and 10 s, the initial buffer durations were decreased below 6 s, but in parallel initial bitrates were reduced to too low values, i.e., less than 500 kbit/s. Thus, amongst the thresholds that has been tested on the model, the threshold region larger than 15 s corresponded to mean bitrate values around 900 kbits while initial buffer duration was slightly around 10 s.

QoE Computation

A set of metrics was used in the QoE computation including the buffer duration, bitrate throughout of the video stream, encoded frame height and width of the video. As we did not have full control over the video source, we did not have information about the encoded frame height and width of the video, and thus we estimated these numbers from the bitrate by using the Kush Gauge method [6]. Motion level 4 a QoE gain of 2% was achieved. It has been also observed that the bitrate switch counts were highly reduced with the help of the ML model. With the model, the increase in the number of video sessions with no bitrate switches were 30% to 40% and 92% to 100% as compared to baseline 2 and baseline 1, respectively.

The ML model helped to reduce the initial buffer duration by 13% (compared to baseline 2) and 55 (compared to baseline 1). The experiments in the study were between 70 s and 90 s long (rather short experiments), where the MOS impact remained at approximately 0.1 on the overall MOS based on the submitted QoE model.

The experiments were conducted in active tests, on one smartphone type, using only one video source. The obtained ML model helped best in maximum throughput ranges around 1.2 Mbit/s. The reason was that the average bitrate was measured as 342 kbits with an average buffer duration of 29.6 s, which yielded a MOS score of 1.53 and 1.40 for baseline 1 and 2, respectively. Applying the model increased the MOS score by 14% (to 1.60). Since the video session durations were in the range between 70 s and 90 s, which was long enough for reduced impact due to the recency effect, the impact of long initial buffering on the MOS values were quite low. A higher impact is expected on shorter video sequences, especially for those video clips (10 s long) that used to be commonly used in the QoE studies.

A ML model was built for a mobile video client, which predicted the initial buffer duration for a set of bitrate values based on a set of network quality metrics. We showed that the right choice of initial bitrate reduced the initial buffer duration, i.e., the join time. The top three important features that influenced the initial buffer durations were obtained, according to the final model, and listed as follows in the descending order of importance: maximum throughput, initial bitrate, and mean initial delay. We presented that the network metrics that were measured prior to the start of the video stream can be utilized to predict the initial buffer duration for a set of initial bitrates, such that a maximized bitrate would be chosen in parallel to minimize the initial buffer duration. We evaluated the model and quantified the QoE gain. Around 18% to 21% QoE was gained with the model as compared to the baseline where the player selects a random bitrate.

Another aspect of the embodiments relates to a device for initial bitrate selection for a video delivery session. The device is configured to perform, during a time window from initiation of a video player application in a user equipment up to selection of a video content, network measurements indicative of a current condition of a network to be used to deliver the video content to the user equipment. The device is also configured to provide, for each bitrate available for the video content, a respective initial buffer duration predicted based on at least one network metric derived from the network measurements. The device is further configured to select an initial bitrate for delivering the video content over the network to the user equipment based on the respective initial buffer durations.

In an embodiment, the device is configured to perform active network measurements during the time window. For instance, the device is configured, in a particular embodiment, to inject probe packets into the network. The device is also configured, in this particular embodiment, to measure delays of the probe packets.

In an embodiment, the device is configured to perform the network measurements on authentication and/or authorization data transmitted over the network between the user equipment and an authentication and/or authorization server.

In an embodiment, the device is configured to determine the at least one network metric based on the network measurements.

In a particular embodiment, the device is configured to determine at least one throughput-based network metric and/or at least one delay-based network metric based on the network measurements In an embodiment, the device is configured to initiate the video player application based on a user-initiated application initiation signal. The device is also configured to perform, based on the user-initiated application initiation signal, the network measurements up to reception of a user-initiated video content selection signal.

In an embodiment, the device is configured to transmit a request for the video content based on a user-initiated video content selection signal. The device is also configured to receive a manifest file comprising information of the bitrates available for the video content.

In an embodiment, the device is configured to transmit information of the bitrates available for the video content and the at least one network metric to an estimation module configured to predict initial buffer durations based on network metrics. The device is also configured to receive the respective initial buffer durations predicted by the estimation module based on the at least one network metric.

In another embodiment, the device is configured to predict, for each bitrate available for the video content, the respective initial buffer duration based on the at least one network metric.

In an embodiment, the device is configured to select the initial bitrate based on the respective initial buffer durations and information of a maximum allowed initial buffer duration.

In a particular embodiment, the device is configured to select, among the bitrates available for the video content, a highest initial bitrate having a predicted initial buffer duration that is lower than the maximum allowed initial buffer duration.

In a particular embodiment, the device is configured to receive a user-initiated buffer duration signal defining the maximum allowed initial buffer duration.

In an embodiment, the device is configured to request the video content at the selected initial bitrate from a content delivery network.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 15:
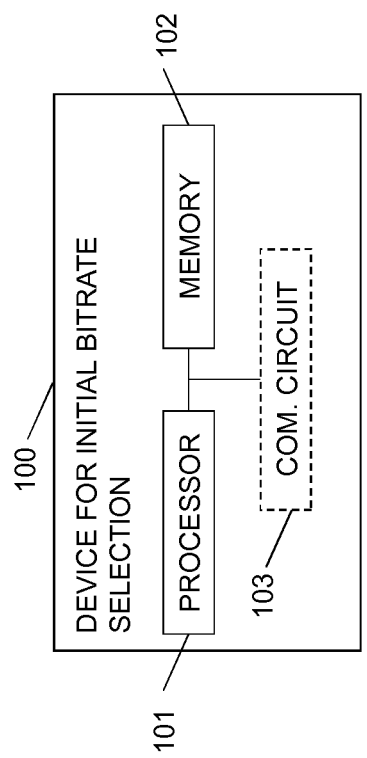
FIG. 15 is a schematic block diagram illustrating a device for initial bitrate selection according to an embodiment.

FIG. 15 is a schematic block diagram illustrating an example of a device 100 for initial bitrate selection for a video delivery session, based on a processor-memory implementation according to an embodiment. In this particular example, the device 100 comprises a processor 101 and a memory 102. The memory 102 comprises instructions executable by the processor 101.

In an embodiment, the processor 101 is operative to perform the network measurements during the time window.

The processor 101 is also operative to provide the respective initial buffer duration and select the initial bitrate.

Optionally, the device 100 may also include a communication circuit 103. The communication circuit 103 may include functions for wired and/or wireless communication with other devices and/or network nodes 30 in a wireless communication network. In a particular example, the communication circuit 103 may be based on radio circuitry for communication with one or more other nodes, including transmitting and/or receiving information. The communication circuit 103 may be interconnected to the processor 101 and/or memory 102. By way of example, the communication circuit 103 may include any of the following: a receiver, a transmitter, a transceiver, input/output (I/O) circuitry, input port(s) and/or output port(s).

Figure 16:
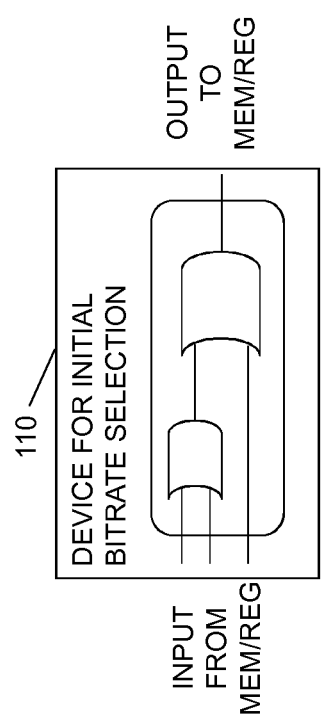
FIG. 16 is a schematic block diagram illustrating a device for initial bitrate selection according to another embodiment.

FIG. 16 is a schematic block diagram illustrating another example of a device 110 for initial bitrate selection for a video delivery session, based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 17:
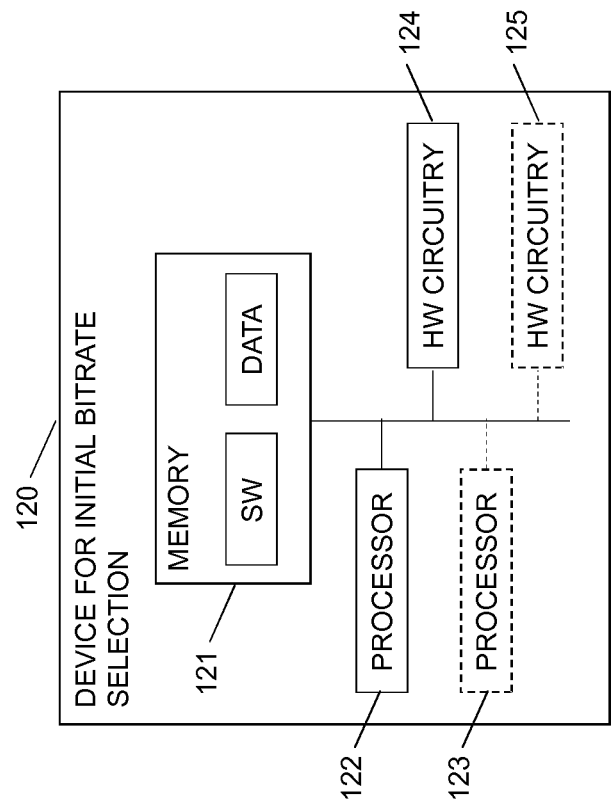
FIG. 17 is a schematic block diagram illustrating a device for initial bitrate selection according to a further embodiment.

FIG. 17 is a schematic block diagram illustrating yet another example of a device 120 for initial bitrate selection for a video delivery session, based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 18:
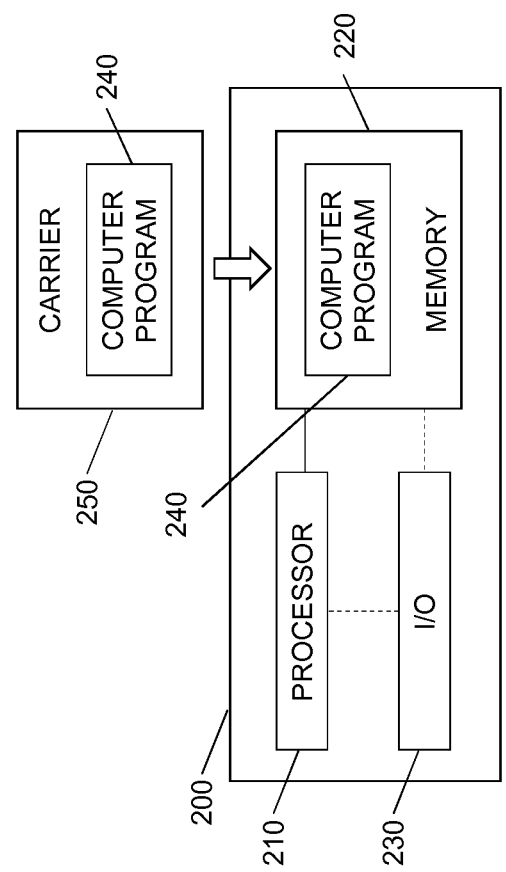
FIG. 18 is schematic block diagram illustrating a user equipment according to an embodiment.

FIG. 18 is a schematic diagram illustrating an example of a user equipment 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional input/output device 230 may also be interconnected to the processor(s) 210 and/or the memory 220 to enable input and/or output of relevant data such as network measurement data, network metrics, manifest file, predicted initial buffer durations, video content requests and video streams.

The term 'processor' should be interpreted in a general sense as any system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to perform, during a time window from initiation of a video player application in a user equipment up to selection of a video content, network measurements indicative of a current condition of a network to be used to deliver the video content to the user equipment. The at least one processor 210 is also caused to provide, for each bitrate available for the video content, a respective initial buffer duration predicted based on at least one network metric derived from the network measurements. The at least one processor 210 is further caused to select an initial bitrate for delivering the video content over the network to the user equipment based on the respective initial buffer durations.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a user equipment 200 for execution by the processing circuitry 210 thereof.

The flow diagram or diagrams presented herein may be regarded as a computer flow diagram or diagrams, when performed by one or more processors. A corresponding device for initial bitrate selection for a video delivery session may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 19:
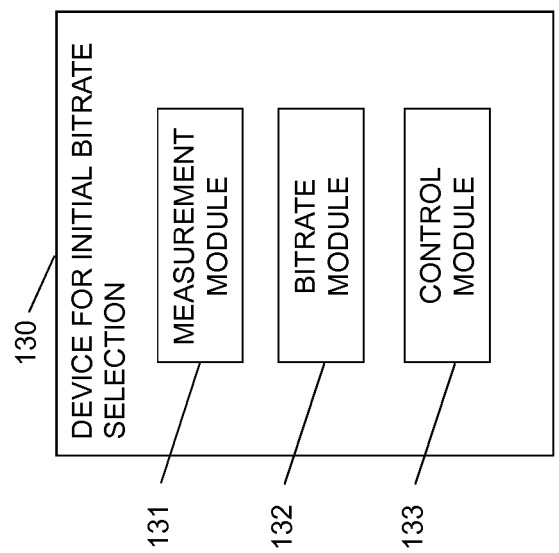
FIG. 19 is a schematic block diagram illustrating a device for initial bitrate selection according to yet another embodiment.

FIG. 19 is a schematic diagram illustrating an example of a device 130 for initial bitrate selection for a video delivery session. The device 130 comprises a measurement module 131 for performing, during a time window from initiation of a video player application in a user equipment up to selection of a video content, network measurements indicative of a current condition of a network to be used to deliver the video content to the user equipment. The device 130 also comprises a bitrate module 132 for providing, for each bitrate available for the video content, a respective initial buffer duration predicted based on at least one network metric derived from the network measurements. The device 130 further comprises a control module 133 for selecting an initial bitrate for delivering said video content over the network to the user equipment based on said respective initial buffer durations.

In an embodiment, the bitrate module 132 is implemented as the previously described estimation module. In another embodiment, the bitrate module 132 is implemented as a communication module for transmission of information of the bitrates available for the video content and the least one network metric to a remote estimation module and for reception of the respective initial buffer durations from the remote estimation module.

A further aspect of the embodiments relates to a user equipment or terminal comprising a device for initial bitrate selection, such as a device described above and shown in any of FIGS. 15-17, 19. In an embodiment, the user equipment is selected from a group consisting of a smartphone, a tablet, a computer, a laptop, a game console, and a set top box.

Actually, the user equipment could be any device, terminal or equipment comprising a video player application or client, or on which such a video player application or client can be run, to thereby play out video on a screen or display of or connected to the user equipment.

It is becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. This applies in particular to the network- or server-implemented estimation module that performs the prediction of initial buffer durations, such as using a ML model. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

FIG. 20 is a schematic diagram illustrating an example of a wireless communication network or system, including an access network 2 and/or a core network 3 and/or an operations and support system (OSS), 4 in cooperation with a CDN 6. The figure also illustrates a user equipment 5 connected to the access network 2 and capable of conducting wireless communication with a base station 1.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Mok et al., Irate: Initial Video Bitrate Selection System for HTTP, *IEEE Journal on selected areas in communications*, vol. 34, no. 6, pages 1914-1928, 2016
[2] Sun et al., CS2P: Improving Video Bitrate Selection and Adaptation with Data-Driven Throughput Prediction, SIGCOMM '16, Proceedings of the 2016 conference on ACM SIGCOMM 2016 Conference, pages 272-285
[3] Blender Foundation, "Big buck bunny," http://peach.blender.org.
[4] Powers, Evaluation: From precision, recall and f-measure to roc, informedness, markedness and correlation, *Journal of Machine Learning Technologies*, vol. 2, no. 1, pages 37-63, 2011
[5] Pedregosa et al., Scikit-learn: Machine learning in Phyton, *Journal of Machine Learning Research*, vol. 12, pages 2825-2830, 2011
[6] Amerasinghe, "H.264 for the rest of us," http://www.adobe.com/contentidam/Adobe/en/devnet/video/articles/h264 primer/h264 primer.pdf.
[7] ITU-T SG12 Q14/12, "Parametric bitstream-based quality assessment of progressive download and adaptive audiovisual streaming services over reliable transport", http://www.itu.int/itu-t/workprog/wp_item.aspx?isn=9707.

The invention claimed is:

1. A device configured for initial bitrate selection for a video delivery session, comprising:
   a processor; and
   a memory storing instructions that, when executed by said processor, cause said device to:
      perform network measurements during a time window that are indicative of a current condition of a network to be used to deliver a video content to said device, the time window starting with initiation by a user of a video player application in the device and ending with selection of video content by the user;
      obtain a predicted initial buffer duration for each available bitrate of the video content, the predicted initial buffer duration being a prediction of the time required to buffer an initial video segment of the video content at the user equipment, based on the available bitrate and the network measurements; and
      select one of the available bitrates as an initial bitrate to use for delivering an initial segment of said video content, the initial bitrate selected as a highest bitrate one among those available bitrates having predicted buffer durations that do not exceed a maximum allowed initial buffer duration.

2. The device according to claim 1, wherein said memory stores instructions that, when executed by said processor, cause said device to perform active network measurements during said time window, as said network measurements.

3. The device according to claim 2, wherein said memory stores instructions that, when executed by said processor, cause said device to perform the active network measurements by injecting probe packets into the network and measuring delays of the probe packets.

4. The device according to claim 1, wherein said memory stores instructions that, when executed by said processor, cause said device to perform said network measurements on authentication and/or authorization data transmitted over said network between said device and an authentication and/or authorization server, for the video delivery session.

5. The device according to claim 1, wherein said memory stores instructions that, when executed by said processor, cause said device to determine said at least one network metric based on said network measurements, and wherein the predicted initial buffer durations are based on the at least one network metric.

6. The device according to claim 5, wherein the at least one network metric is at least one throughput-based network metric and/or at least one delay-based network metric.

7. The device according to claim 1, wherein said memory stores instructions that, when executed by said processor, cause said device to:
   initiate said video player application based on a user-initiated application initiation signal; and
   perform, based on said user-initiated application initiation signal, said network measurements up to reception of a user-initiated video content selection signal.

8. The device according to claim 1, wherein said memory stores instructions that, when executed by said processor, cause said device to:
- transmit a request for said video content based on a user-initiated video content selection signal; and
- receive a manifest file comprising information of the available bitrates for said video content.

9. The device according to claim 1, wherein said memory stores instructions that, when executed by said processor, cause said device to obtain the predicted initial buffer durations by transmitting information to a server that indicates the network measurements or one or more network metrics derived therefrom and further indicates the available bitrates, and, in return, receiving the predicted initial buffer durations from the server.

10. The device according to claim 1, wherein said memory stores instructions that, when executed by said processor, cause said device to obtain the predicted initial buffer durations via an estimation module implemented in said device.

11. The device according to claim 1, wherein said memory stores instructions that, when executed by said processor, cause said device to receive a user-initiated buffer duration signal defining said maximum allowed initial buffer duration.

12. The device according to claim 1, said memory stores instructions that, when executed by said processor, cause said device to request said video content at said selected initial bitrate from a content delivery network.

13. A user equipment configured for operation in a wireless communication network, the user equipment comprising:
- communication circuitry configured for communicating with the wireless communication network; and
- processing circuitry operatively associated with the communication circuitry and configured to:
  - perform network measurements during a time window that are indicative of a current condition of the wireless communication network, for streaming a video content to the user equipment in a video delivery session, the time window starting with initiation by a user of a video player application in the device and ending with selection of video content by the user;
  - obtain a predicted initial buffer duration for each available bitrate of the video content, the predicted initial buffer duration being a prediction of the time required to buffer an initial video segment of the video content at the user equipment, based on the available bitrate and the network measurements; and
  - select one of the available bitrates as an initial bitrate to use for delivery of an initial segment of the video content, the initial bitrate selected as a highest bitrate one among those available bitrates having predicted buffer durations that do not exceed a maximum allowed initial buffer duration.

14. A method performed by a user equipment, the method comprising:
- performing network measurements during a time window that are indicative of a current condition of a network to be used for delivery of video content in a video delivery session, the time window starting with initiation by a user of a video player application in the user equipment and ending with selection of video content by the user;
- obtaining a predicted initial buffer duration for each available bitrate of the video content, the predicted initial buffer duration being a prediction of the time required to buffer an initial video segment of the video content at the user equipment, based on the available bitrate and the network measurements; and
- selecting one of the available bitrates as an initial bitrate to use for delivery of an initial segment of the video content, the initial bitrate selected as a highest bitrate one among those available bitrates having predicted buffer durations that do not exceed a maximum allowed initial buffer duration.

15. The method according to claim 14, wherein the method further comprises detecting the start of the time window by detecting a user-initiated application signal, indicating initiation of the video player application by the user, and detecting the end of the time window by detecting a user-initiated video content selection signal, indicating selection of the video content.

16. The method according to claim 14, further comprising determining the maximum allowed initial buffer duration from a user-initiated buffer duration signal that defines the maximum allowed initial buffer duration.

17. The method according to claim 16, further comprising causing the user equipment to display various buffer durations on a screen of the user equipment, and wherein the user-initiated buffer duration signal indicates a user-selected one among the various buffer durations.

18. The method according to claim 14, further comprising determining the maximum allowed initial buffer duration based on the length of the video content.

19. The method according to claim 14, further comprising determining the maximum allowed initial buffer duration based on prior input from the user, indicating a user-selected maximum.

20. The method according to claim 14, further comprising determining the maximum allowed initial buffer duration in dependence on at least one of: a screen size of the user equipment, a type or version of the user equipment, or a type or version of the video player application.

21. The method according to claim 14, wherein the method further comprises predicting the initial buffer durations corresponding to the available bitrates of the video content using an estimation module resident in the user equipment.

22. The method according to claim 21, wherein the estimation module is a Machine Learning (ML) module that uses metrics derived from the network measurements to estimate the initial buffer duration for the initial segment of the video content, for each of the available bitrates.

23. The method according to claim 14, wherein obtaining the predicted initial buffer duration for each available bitrate of the video content comprises transmitting information to a server and receiving the predicted initial buffer durations in return, the transmitted information indicating the available bitrates and the network measurements.

24. The method according to claim 14, wherein performing the network measurements comprises performing passive measurements on authentication or authorization information that is exchanged between the user equipment and a server, for authentication or authorization of the user equipment with respect to establishing the video delivery session.

* * * * *